United States Patent
Sakuragi et al.

(10) Patent No.: US 9,142,259 B2
(45) Date of Patent: Sep. 22, 2015

(54) EDITING DEVICE, EDITING METHOD, AND PROGRAM

(75) Inventors: Ryoichi Sakuragi, Kanagawa (JP); Yukiko Nishimura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 65 days.

(21) Appl. No.: 13/529,160

(22) Filed: Jun. 21, 2012

(65) Prior Publication Data

US 2012/0328265 A1 Dec. 27, 2012

(30) Foreign Application Priority Data

Jun. 27, 2011 (JP) ................. 2011-141445

(51) Int. Cl.
| | |
|---|---|
| G11B 27/34 | (2006.01) |
| G11B 27/036 | (2006.01) |
| G11B 27/06 | (2006.01) |
| G11B 27/10 | (2006.01) |

(52) U.S. Cl.
CPC .............. *G11B 27/34* (2013.01); *G11B 27/036* (2013.01); *G11B 27/06* (2013.01); *G11B 27/105* (2013.01)

(58) Field of Classification Search
CPC .... G11B 27/034; G11B 27/34; G11B 27/031; G11B 2220/90; G11B 2220/2562; G11B 27/036; G11B 27/10; G11B 27/02
USPC .................................................. 386/278–290
See application file for complete search history.

(56) References Cited

U.S. PATENT DOCUMENTS

| | | | | |
|---|---|---|---|---|
| 6,414,686 | B1 * | 7/2002 | Protheroe et al. ............. | 345/474 |
| 7,769,270 | B2 * | 8/2010 | Nakamura et al. ............ | 386/280 |
| 7,788,585 | B2 * | 8/2010 | Ubillos ......................... | 715/723 |
| 7,930,624 | B2 * | 4/2011 | Phillips et al. ................ | 715/201 |
| 2004/0027369 | A1 * | 2/2004 | Kellock et al. ................ | 345/716 |
| 2006/0008247 | A1 * | 1/2006 | Minami et al. ................. | 386/52 |
| 2009/0219989 | A1 * | 9/2009 | Tanaka et al. ............ | 375/240.01 |
| 2010/0260468 | A1 * | 10/2010 | Khatib et al. .................. | 386/52 |

* cited by examiner

*Primary Examiner* — Gelek W Topgyal
(74) *Attorney, Agent, or Firm* — Hazuki International, LLC

(57) ABSTRACT

Provided is an editing device including an input material timeline area display control unit that executes control such that an input material timeline in which an event is arranged is displayed, using a material which is an element of selected content as the event, and an output material timeline area display control unit that executes control such that an output material timeline in which an event which is being edited or has been edited is arranged is displayed. The input material timeline and the output material timeline have a same time axis, and the input material timeline area display control unit controls a display of the input material timeline such that the event arranged in the input material timeline is expressed by the same time axis as the event arranged in the output material timeline.

9 Claims, 19 Drawing Sheets

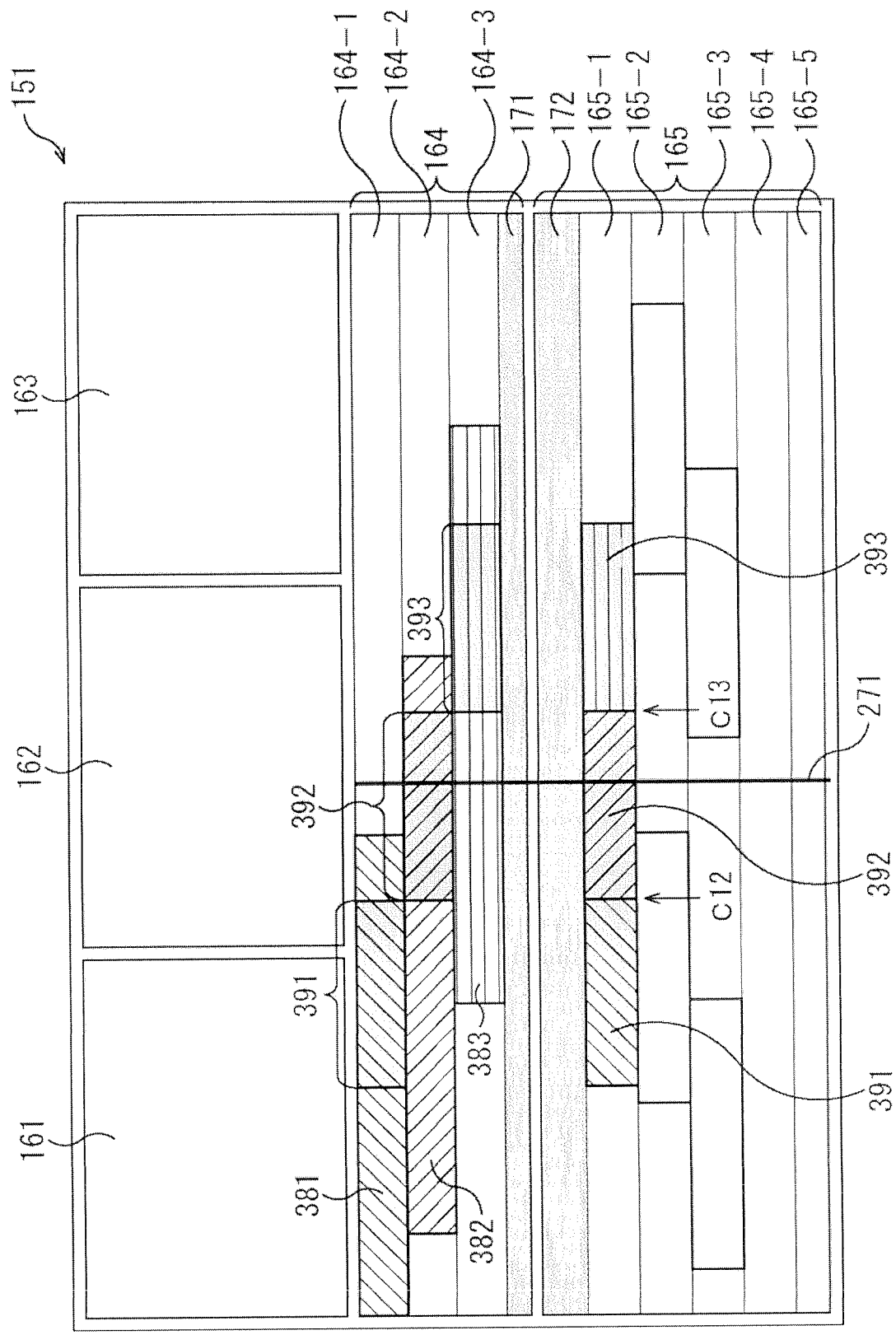

EDITING DEVICE, EDITING METHOD, AND PROGRAM

BACKGROUND

The present technology relates an editing device, an editing method, and a program, and more particularly, to an editing device, an editing method, and a program, in which a temporal relation between a material used for editing and content which is being edited can be intuitively understood.

In the related art, in the scene of content production, an editor produces data of content by performing editing on various materials using an editing device.

Here, a material refers to data which can be an element of content recorded in a storage such as a tape, a disk, and a memory. Specifically, a material refers to data such as a moving image, a still image, and a sound. Further, editing refers to a cut edit, a trim edit, or the like, which is performed on a material taken into, for example, an editing device. For example, reference may be made to Grass Valley K.K., "EDIUS 6", [online], [searched on Apr. 1, 2011], Internet <URL: http://www.thomson-canopus.jp/catalog/edius_pro/edius_6_index.php>, Adobe Systems Incorporated, "Adobe Premiere Pro CS5," [online], [searched on Apr. 1, 2011], Internet <URL: http://help.adobe.com/ja_JP/premierepro/cs/using/index.html>, Apple Inc., "Final Cut Pro7 User Manual," [online], [searched on Apr. 1, 2011], Internet <URL: http://documentation.apple.com/en/finalcutpro/usermanual/>, Sony Creative Software, "Outline of Vegas Pro 10," [online], [searched on Apr. 1, 2011], Internet <URL: http://www.sonycreativesoftware.com/vegaspro/>, and Avid Technology Inc., "Media Composer 5.5," [online], [searched on Apr. 1, 2011], Internet <URL: http://www.avid.com/JP/products/Media-Composer/resources>.

An editing screen of an editing device includes an area (hereinafter referred to as a "material preview area") for previewing a video of a material used for editing, that is, an original video which is not edited yet and an area (hereinafter referred to as a "timeline preview area") for previewing a video of content which is being edited or has been edited on a timeline. Here, a timeline refers to a time axis of content produced by an editor, and is displayed on an area (hereinafter referred to as a "timeline area"), in the editing screen, which is different from the timeline preview area.

SUMMARY

However, in the editing devices disclosed in the related arts such as the above mentioned references, a time axis expressed in the material preview area is different from a time axis expressed in the timeline area. Thus, it is difficult for an editor to intuitively understand a temporal relation between a material used for editing, which follows the time axis of the material preview area, and content being edited, which follows the time axis of the timeline area.

The present technology is made in light of the foregoing, and it is desirable to be able to intuitively understand a temporal relation between a material used for editing and content being edited.

According to an embodiment of the present disclosure, there is provided an editing device which includes an input material timeline area display control unit that executes control such that an input material timeline in which an event is arranged is displayed, using a material which is an element of selected content as the event, and an output material timeline area display control unit that executes control such that an output material timeline in which an event which is being edited or has been edited is arranged is displayed, wherein the input material timeline and the output material timeline have a same time axis, and the input material timeline area display control unit controls a display of the input material timeline such that the event arranged in the input material timeline is expressed by the same time axis as the event arranged in the output material timeline.

The editing device may further include an output material check area display control unit that reproduces the event arranged in the output material timeline in an output material check area, and a display control total management unit that executes control such that a play line representing a reproduction position of the event by the output material check area display control unit is moved along the same time axis and displayed. When the event arranged in the output material timeline is reproduced by the output material check area display control unit after a provisional in point of a predetermined section in the event arranged in the input material timeline is decided, the input material timeline area display control unit may control a display of the input material timeline such that the event arranged in the input material timeline is moved to follow movement of the play line in a state in which the event is fixed to the play line displayed by control of the display control total management unit at a position of the provisional in point.

When a provisional mark-in point of the predetermined section in the event arranged in the input material timeline is decided in the output material timeline, the output material check area display control unit may reproduce the event arranged in the output material timeline in the output material cheek area and then continuously reproduce a portion subsequent to the provisional in point of the event arranged in the input material timeline.

When a provisional out point of the predetermined section in the event arranged in the input material timeline is decided and the predetermined section of the event is decided, the output material check area display control unit may control a display of the output material timeline such that the predetermined section of the event is arranged.

The editing device may further include an input material check area display control unit that reproduces the event arranged in the input material timeline in an input material check area. When the event arranged in the input material timeline becomes a reproduction target, the display control total management unit may further determine whether or not the reproduction target is the selected material. When the display control total management unit determines that the reproduction target is the selected material, the input material check area display control unit may reproduce the selected material. When the display control total management unit determines that the reproduction target is not the selected material, the input material check area display control unit may reproduce a recommended material set by a predetermined condition.

An editing method and a program according to an embodiment of the present technology correspond to the editing device according to the embodiment of the present technology.

In the editing device, the editing method, and the program according to the embodiment of the present technology, a material of selected content is used as an event, control is executed such that an input material timeline in which an event is arranged is displayed, and control is executed such that an output material timeline in which an event which is being edited or has been edited is arranged is displayed. The input material timeline and the output material timeline have the same time axis, and a display of the input material timeline is controlled such that the event arranged in the input material timeline is expressed by the same time axis as the event arranged in the output material timeline.

As described above, according to the embodiments of the present technology, a temporal relation between a material used for editing and content being edited can be intuitively understood.

BRIEF DESCRIPTION OF THE DRAWINGS

FIG. 19 is a diagram to explain another trim edit.

DETAILED DESCRIPTION OF THE EMBODIMENT(S)

Figure 1:
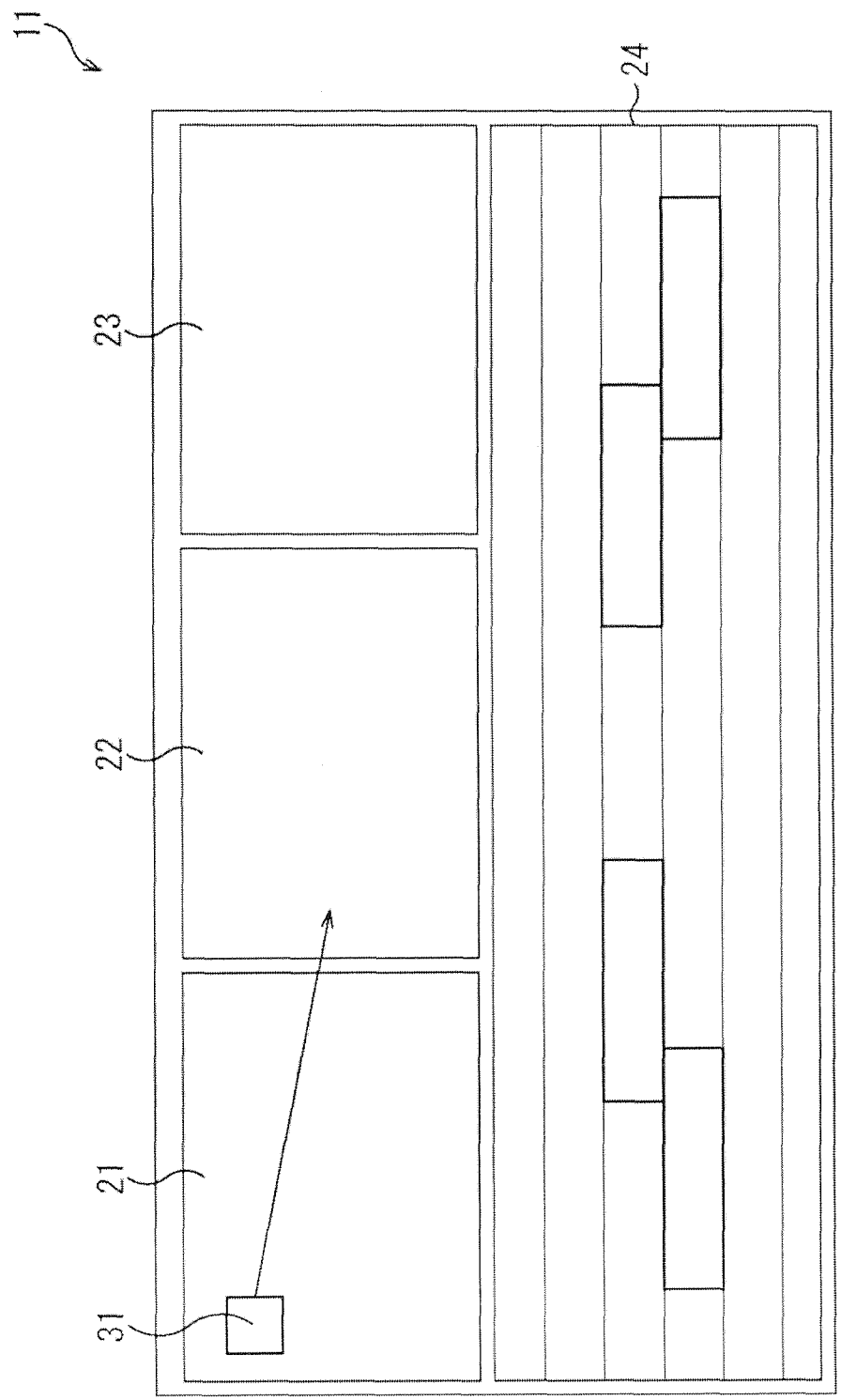
FIG. 1 is a diagram illustrating an example of an editing screen which is the background of the present technology.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

The inventors performed a cut edit using an editing screen which is the background of the present technology and conducted studies on operability thereof.

A cut edit refers to a series of editing tasks to be described below. First, a material used for production of content is selected from among materials taken into an editing device as an input material. Then, a predetermined section of the selected input material is selected as a section (hereinafter referred to as a "use target section") to be added to a predetermined material. Then, the selected use target section is overwritten in or inserted into a predetermined section (hereinafter referred to as a "use destination section") of a predetermined material. By performing the cut edit, which is such a series of editing tasks, an output material is produced as content.

[Editing Screen which Becomes Background of Present Technology]

FIG. 1 is a diagram illustrating an example of an editing screen which is the background of the present technology.

The editing screen 11 illustrated in FIG. 1 includes a material management area 21, an input material check area 22, an output material check area 23, and a timeline area 24.

An event is employed as a unit of an editing process using the editing screen 11. An event refers to a logical material that holds information of a material of a reference source and time data of two points including an in point and an out point which are set on the material.

For example, information representing a recording position of a material in an editing device is displayed on the material management area 21. Specifically, for example, the information is displayed in the form of a tree structure so that a recording position of a material in an editing device can be seen, for example, like a display by Microsoft's Explorer (a registered trademark). In the example of FIG. 1, only a symbol 31 (hereinafter abbreviated to as a "material 31") representing a predetermined material among a plurality of materials which an editor uses in editing is displayed on the material management area 21.

A material selected from the material management area 21 is previewed in the input material check area 22 as an input material.

An event which is being edited or has been edited in the timeline area 24 is previewed on the output material check area 23.

A timeline is displayed on the timeline area 24. The timeline includes a plurality of tracks, and in the example of FIG. 1, 6 tracks are displayed.

The timeline represents a time axis of content produced by the editor. On the timeline, an arrangement of an event which is being edited or has been edited and the content of the editing process are displayed for each track in time series using a diagram. The event is represented by each of quadrangular marks arranged on the track. Each timeline is configured with single content. A track is an area in which an event is arranged and edited. Tracks are classified into a video track for editing video data (that is, still image data or moving image data), an audio track for editing audio data, a character generator (CG) track for editing CG data, and the like. The editor can perform various edits of layering video data, audio data, CG data, and the like using the track and then adding an effect or overlaying a telop, a sound track, or the like. The editor can perform various edits of adding a narration to a track or adding back ground music (BGM) to another track using a plurality of audio tracks. All of the video track, the audio track, the CG track, and the like present on the timeline are synthesized after various edits to thereby configure final content.

The editor reads the material 31 which is the input material into the input material check area 22 by selecting the material 31 in the material management area 21 as the input material and then performing a drag operation or by performing an operation of selecting a corresponding menu from a menu list. Then, the editor causes the material 31 which is the input material to be previewed in the input material check area 22 as illustrated in FIG. 2.

Figure 2:
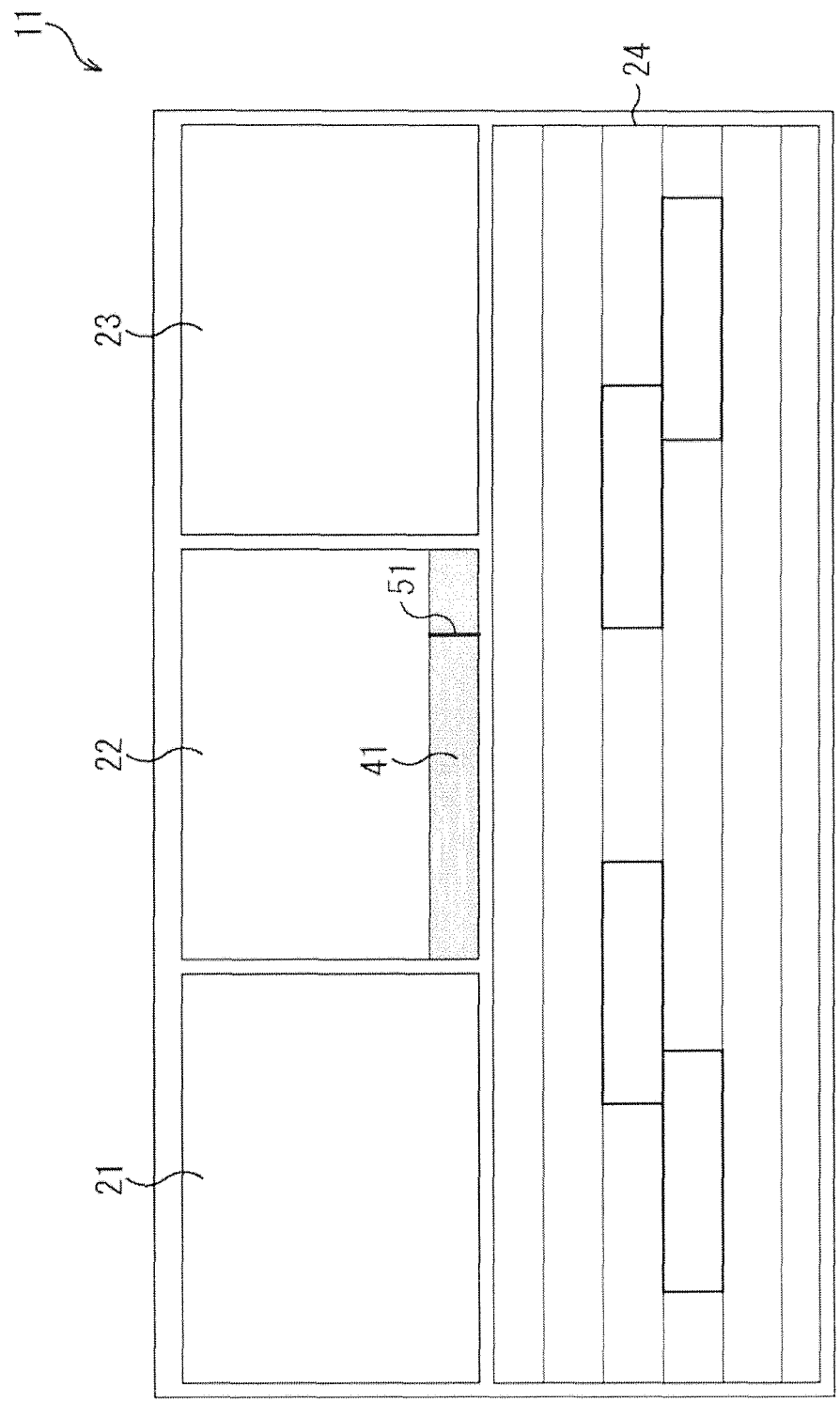
FIG. 2 is a diagram illustrating an example in which a video corresponding to a selected material is previewed.

FIG. 2 is a diagram illustrating an example in which the material 31 which is the input material is previewed.

The editor causes the material 31 which is the input material to be previewed in the input material check area 22 by performing an operation of a button (not shown) displayed on the input material check area 22 or performing a predetermined operation through an input device such as a keyboard in a state in which a focus is set to the input material check area 22.

A play line 51 representing a reproduction position at which the material 31 which is the input material is previewed is displayed on the play line area 41. In other words, the entire section (that is, the length in a horizontal direction) of the play line area 41 corresponds to the duration of the material 31 which is the input material, and the play line 51 is movable in the entire section of the play line area 41. Thus, the editor decides a use target section of the material 31 which is the input material with reference to the position of the play line 51 as illustrated in FIG. 3.

Further, when a plurality of materials are selected, the editor produces a composite clip for displaying a plurality of events together and then decides a use target section.

Figure 3:
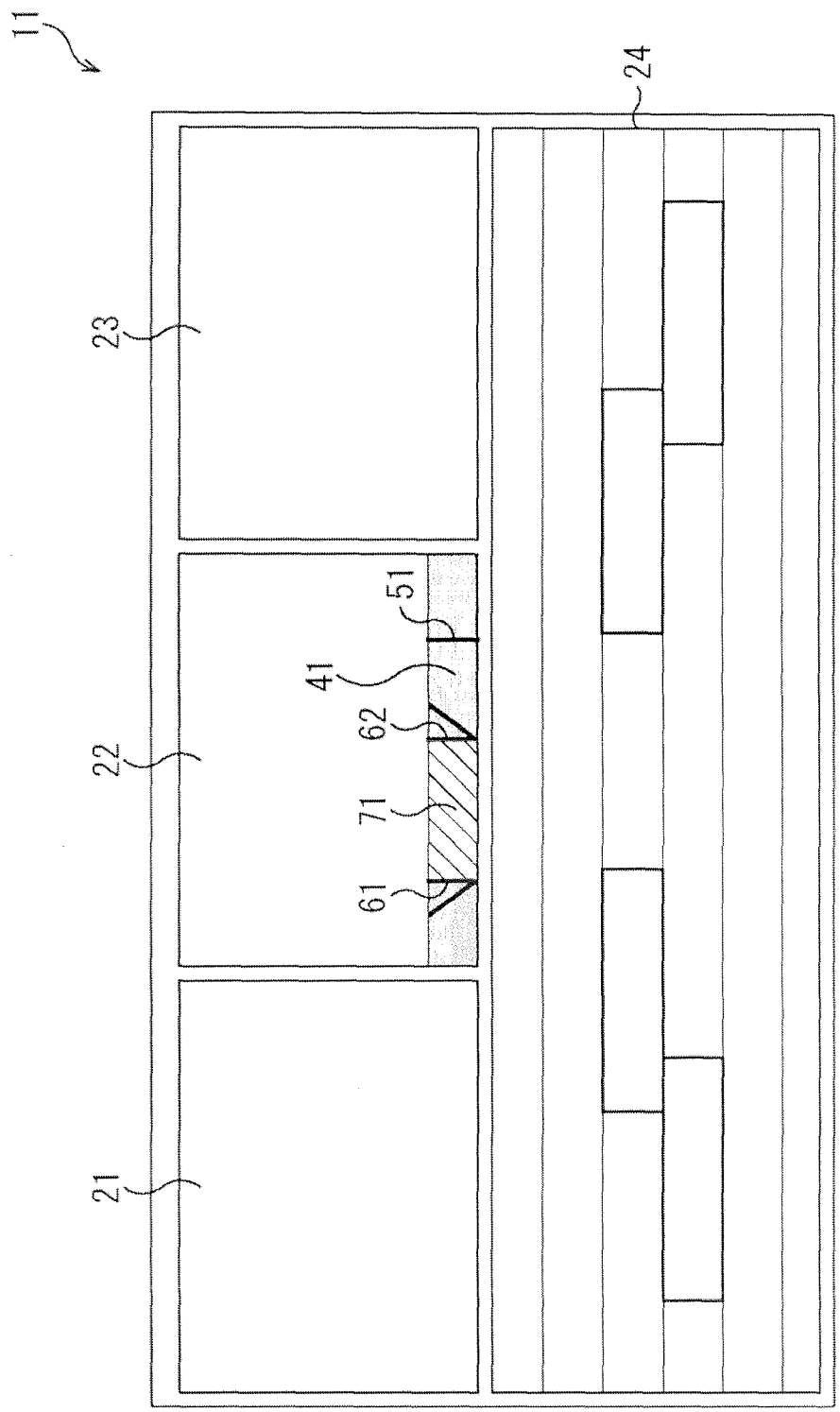
FIG. 3 is a diagram illustrating an example in which a use target section of a material is decided.

FIG. 3 is a diagram illustrating an example in which the use target section of the material 31 which is the input material is decided.

The editor sets an in point 61 and an out point 62 to the play line area 41 with reference to the position of the play line 51, and decides a section between the in point 61 and the out point 62 as the use target section 71 of the material 31 which is the input material. Next, the editor decides the start position of the use destination section on the timeline as illustrated in FIG. 4.

Figure 4:
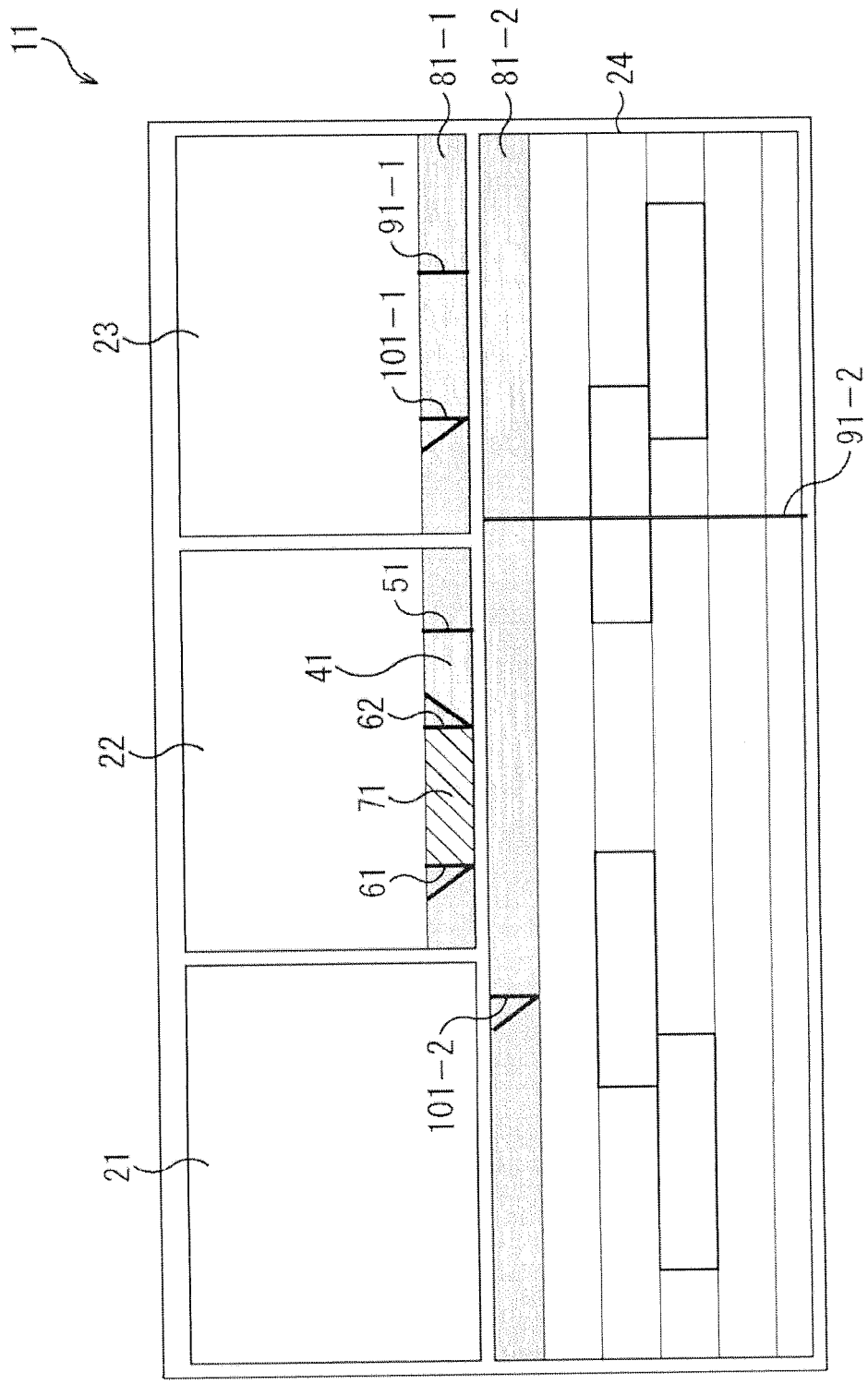
FIG. 4 is a diagram illustrating an example in which a start position of a use destination section is decided.

FIG. 4 is a diagram illustrating an example in which the start position of the use destination section on the timeline is decided.

The editor causes an event arranged on the timeline to be previewed in the output material check area 23 by performing an operation of a button (not shown) displayed on the timeline area 24 or performing a predetermined operation through an input device in a state in which a focus is set to the timeline area 24.

A play line 91-2 is displayed on the timeline area 24. The play line 91-2 represents a reproduction position of the timeline previewed in the output material check area 23. In other words, all events positioned on the play line 91-2 are synthesized and previewed in the output material check area 23.

Thus, the editor decides the start position of the use destination section on the timeline with reference to the position of the play line 91-2, and sets a mark-in point 101-2 to a play line area 81-2. Next, the editor arranges a use target section 71 of the material 31 at the position at which the mark-in point 101-2 of the timeline area 24 is set as illustrated in FIG. 5.

A play line area 81 of the output material check area 23 and a play line area 81-2 of the timeline area 24 are different in the scale (that is, a relative length on a display screen) but are actually displayed with the same duration. Thus, a play line 91-1 and a mark-in point 101-1 displayed on the play line area 81-1 of the output material check area 23 represent the same time of the timeline as the play line 91-2 and the mark-in point 101-2 displayed on the play line area 81-2 of the timeline area 24.

Figure 5:
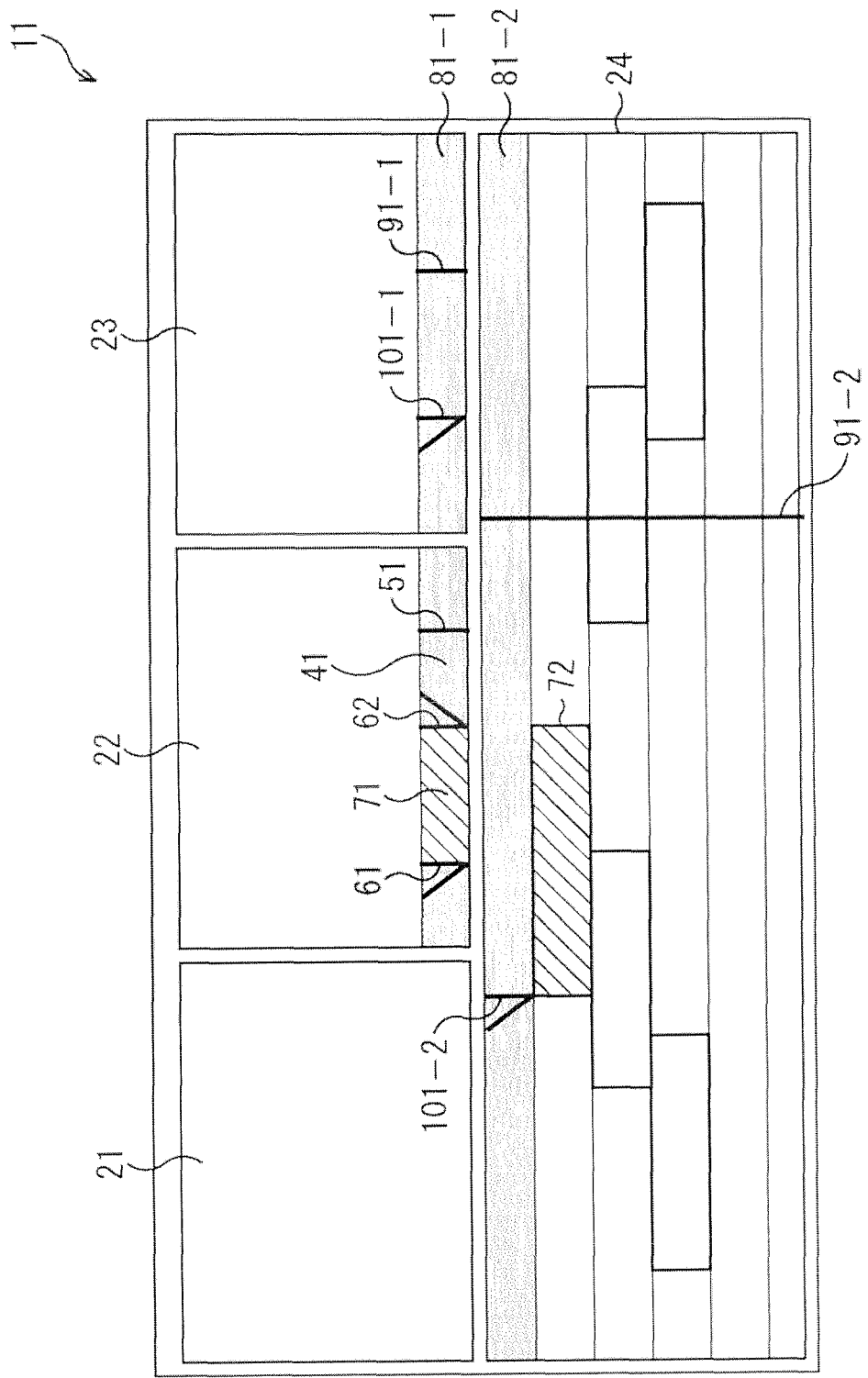
FIG. 5 is a diagram illustrating an example in which a use target section is arranged on a timeline.

FIG. 5 is a diagram illustrating an example in which the use target section 71 of the material 31 is arranged on the timeline.

The editor clips the use target section 71 of the material 31 which is the input material by performing a predetermined operation through an input device, and arranges an event 72 at the position represented by the mark-in point 101-2 on the timeline of the timeline area 24.

As a technique of arranging the use target section 71 of the input material on the timeline, a technique of deciding three points from among four points including the in point and the out point on the input material and the mark-in point and the mark-out point on the timeline may be used. The mark-out point represents the end position of the use destination section. This technique is referred to as a three-point edit, and when three points are decided from among four points, there are four patterns. A technique of deciding four points is referred to as a four-point edit, and in this case, there is one pattern. Thus, there are a total of five patterns as techniques of arranging the use target section 71 on the timeline.

Next, the editor causes the event arranged on the timeline to be previewed in the output material check area 23, and checks a video of a the joint between the event 72 and another event. When the video of the joint is unnatural or imperfect, the editor performs a trim edit of finely adjusting the video of the joint. The trim edit is performed in a state in which another display screen for trimming is opened. The trim edit will be described with reference to FIG. 6.

Figure 6:
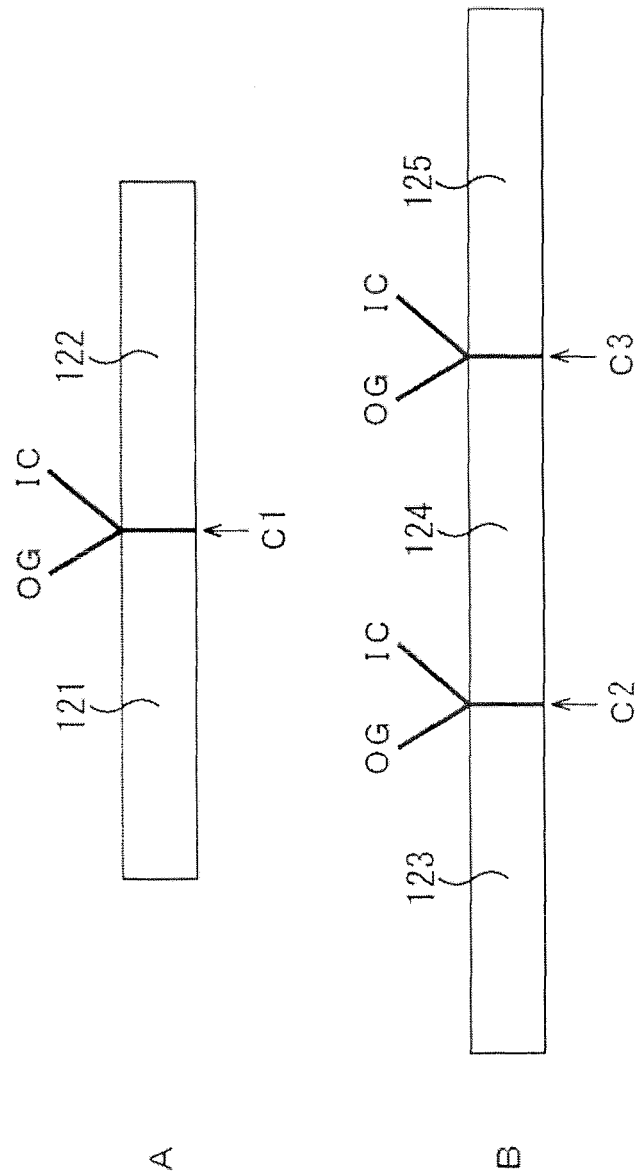
FIG. 6 is a diagram to explain a trim edit.

FIG. 6 is a diagram to explain the trim edit.

FIG. 6A is a diagram to explain an A side edit, a B side edit, and an AB side edit in the trim edit. As illustrated in FIG. 6A, an event 121 is connected with the event 122 at a cut point C1.

At this time, a trim edit in which only the section end position of the event 121 represented by OG (outgoing) in the joint between the event 121 and the event 122 is changed is referred to as an A side edit. On the other hand, a trim edit in which only the section start position of the event 122 represented by IC (incoming) in the joint between the event 121 and the event 122 is changed is referred to as a B side edit. Further, a trim edit in which both positions are changed is referred to as an AB side edit.

FIG. 6B is a diagram to explain a slip edit and a slide edit in the trim edit. As illustrated in FIG. 6B, an event 123 is connected with an event 124 at a cut point C2, and the event 124 is connected with an event 125 at a cut point C3. In the event 124, a use target section of a predetermined input material is arranged between the event 123 and the event 125.

At this time, a trim edit in which the duration of the event 124 does not change, and only the positions of an in point and an out point of a use target section of an input material of a clipping source of the event 124 are changed is referred to as a slip edit. As a result of the slip edit, since only the video of the event 124 is changed and the duration thereof does not change, there is no influence of the edit on the event 123 and the event 125.

On the other hand, a trim edit in which an arrangement position of the event 124 is changed is referred to as a slide edit. In other words, the content and the duration of the event 124 do not change, and the arrangement position of the event 124 is shifted to the left side or the right side further than the position illustrated in FIG. 6. At this time, when the arrangement position of the event 124 is shifted to the left side further than the position illustrated in FIG. 6B as a result of the slide edit, the video of the event 123 decreases, and the video of the event 125 increases. Meanwhile, when the arrangement position of the event 124 is shifted to the right side further than the position illustrated in FIG. 6B, the video of the event 123 increases, and the video of the event 125 decreases. As described above, when the slide edit is performed, the event 123 and the event 125 are affected by the edit.

The editor produces an output material including the newly arranged event 72 by performing this trim edit, thereby completing content.

Further, as illustrated in FIG. 1, the editor may not perform the editing after reading the material 31 which is the input material selected in the material management area 21 into the input material check area 22. In other words, the editing may be performed after the material 31 which is the input material selected in the material management area 21 is directly arranged at a predetermined position of the timeline area 24 as illustrated in FIG. 7.

Figure 7:
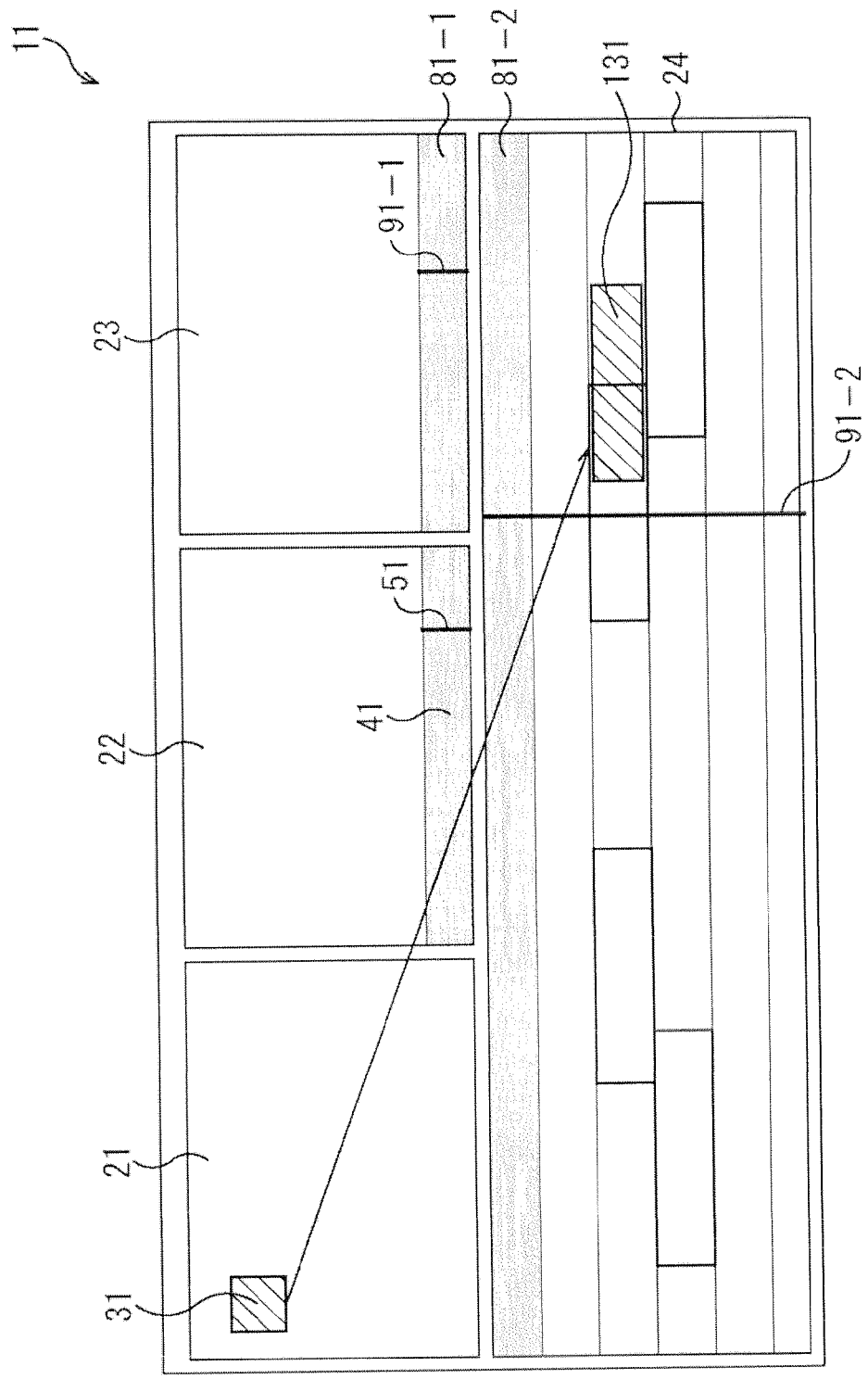
FIG. 7 is a diagram to explain an example in which a material is directly arranged in a timeline area.

FIG. 7 is a diagram to explain an example in which the material 31 is directly arranged in the timeline area 24.

The editor performs a drag operation or an operation of selecting a corresponding menu from a menu list and so arranges the material 31 which is the input material selected in the material management area 21 in the timeline area 24 as the event 131. Then, the editor causes the event 131 to be previewed in the output material check area 23, and then performs editing of deleting an unnecessary section of the event 131 with reference to the position of the play line 91-1 or the play line 91-2. In other words, the editor decides a use target section of the event 131.

Next, the editor causes the event arranged in the timeline area 24 to be previewed in the output material check area 23, and decides the start position of the use destination section on the timeline with reference to the position of the play line 91-1 or the play line 91-2. Then, the editor arranges the event 131 having only the necessary section at the start position of the use destination section on the timeline. Finally, the editor checks the joint between the event 131 and another event, and then performs the trim edit as necessary.

As described above, the editor performs the cut edit through the editing screen 11 to produce content.

However, in the editing screen 11, the time axis expressed in the input material check area 22 is different from the time axis expressed in the timeline area 24. For this reason, it is difficult for the editor to intuitively understand a temporal relation between an input material and an event which is being edited. In other words, it is difficult for the editor to intuitively understand a temporal relation between the use target section of the input material and the use destination section of the timeline. Thus, it is also difficult to intuitively perform the trim edit.

Further, the arrangement positions of the input material check area 22, the output material check area 23, and the timeline area 24 on the display screen are spaced apart from one another. Thus, for example, when the editor is not familiar with the editing, it takes a long time to perform, for example, editing of deciding the in point and the out point of the use target section or the mark-in point and the mark-out point of the use destination section. Thus, in order for the editor to learn the editing using the editing screen 11 and reduce a time, a huge amount of effort and learning time are necessary.

In addition, in the editing using the editing screen 11, all editing in the timeline area 24 is retained as editing history. Thus, when the input material is directly arranged at a predetermined position of the timeline area 24 and then the editing is performed as described above with reference to FIG. 7, the editing of deciding the use target section of the input material in the timeline area 24 is all retained as editing history. Thus, when the editing is re-executed (that is, Redo) or edited content is canceled (that is, Undo) on the event arranged in the timeline area 24, it is difficult to cover desired editing.

Figure 8:
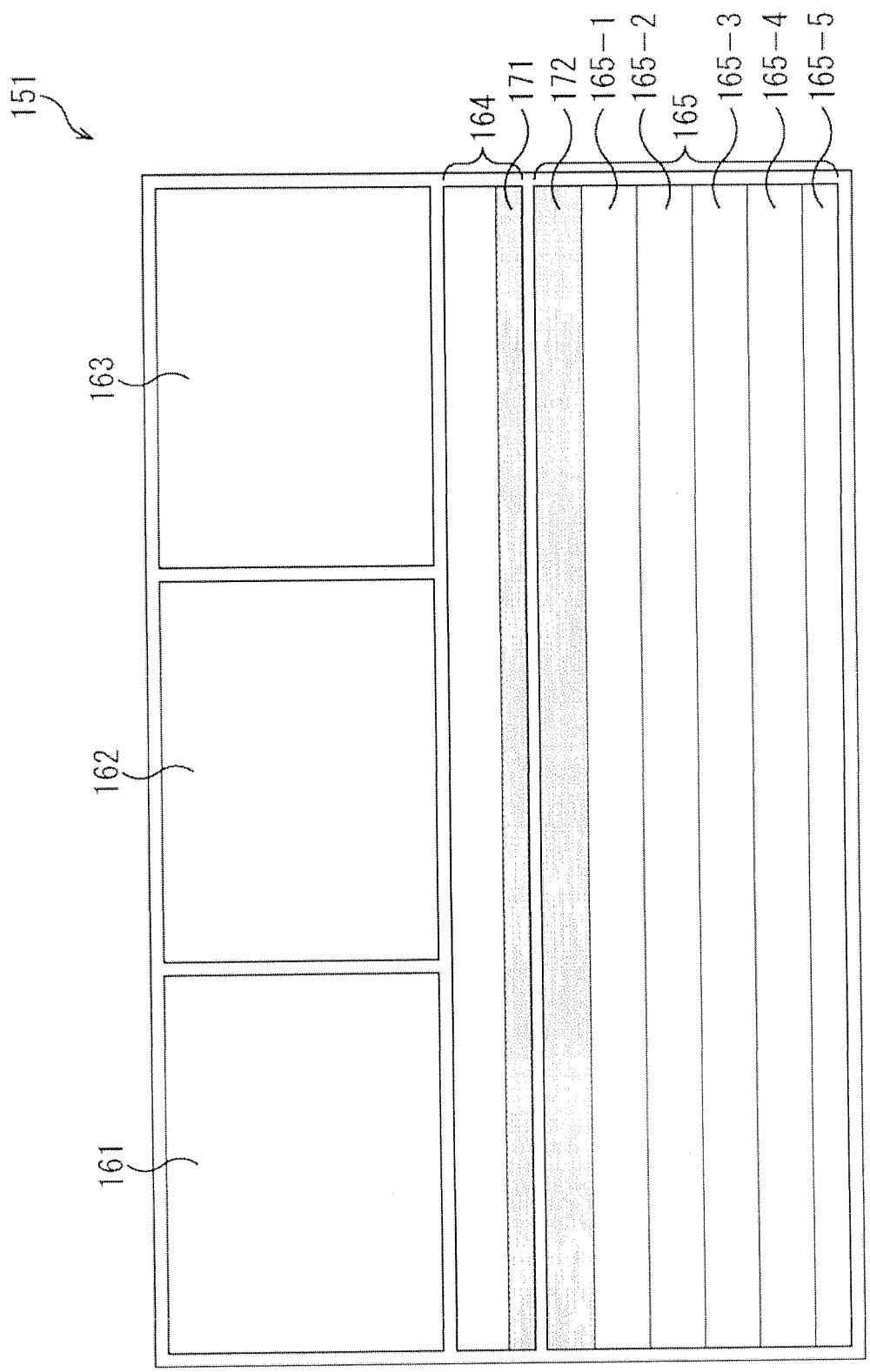
FIG. 8 is a diagram to explain an outline of the present technology.

In light of the foregoing, the inventors have created technical ideas illustrated in FIG. 8 and the drawings subsequent thereto. As a result, a temporal relation between a material used for an edit and content being edited can be intuitively understood.

[Outline of Present Technology]

FIG. 8 is a diagram to explain an outline of the present technology.

An editing screen 151 illustrated in FIG. 8 includes a material management area 161, an input material check area 162, an output material check area 163, an input material timeline area 164, and an output material timeline area 165.

For example, information representing a recording position of a material in an editing device is displayed on the material management area 161.

An event arranged in the input material timeline area 164 is previewed in the input material check area 162.

An event which is being edited or has been edited in the input material timeline area 164 or the output material timeline area 165 is previewed in the output material check area 163.

An input material timeline is displayed on the input material timeline area 164. This timeline includes a plurality of tracks, and only one track is displayed in the example of FIG. 8. A material selected in the material management area 161 is arranged in the input material timeline area 164 as an event expressed in the same time axis as an event arranged in the output material timeline area 165. The input material timeline area 164 includes a play line area 171. An in point and an out point for deciding a use target section of an event to be arranged in the input material timeline area 164 are set to the play line area 171.

An output material timeline is displayed on the output material timeline area 165. This timeline includes a plurality of tracks, and tracks 165-1 to 165-5 are displayed in the example of FIG. 8. An arrangement of an event which is being edited or has been edited and the content of the editing process are displayed on this timeline in time series using a diagram. The output material timeline area 165 includes a play line area 172. A mark-in point and a mark-out point for deciding the use destination section of the output material timeline are set to the play line area 172.

As described above, the editing screen 151 includes the input material timeline area 164. The input material timeline area 164 is an area independent of the output material timeline area 165, whereas the input material timeline area 164 has the same axis as the output material timeline area 165. In other words, an event arranged in the input material timeline area 164 is expressed by the same axis as an event arranged in the output material timeline area 165. As a result, as will be described later, the editor can intuitively understand a temporal relation between a material used for editing and content being edited.

Figure 9:
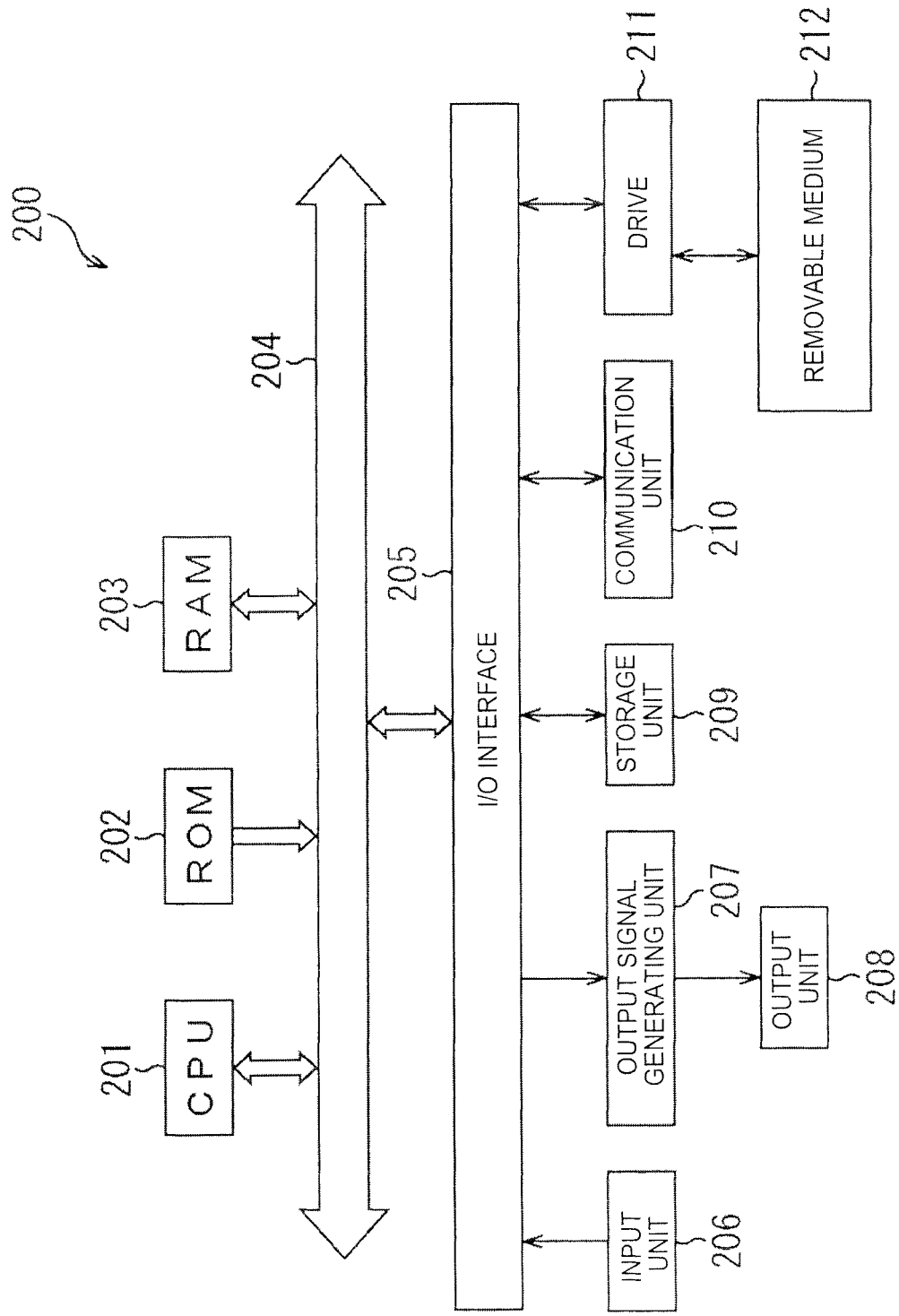
FIG. 9 is a block diagram illustrating a hardware configuration example of an embodiment of an editing device.

FIG. 9 is a block diagram illustrating a hardware configuration example of an embodiment of an editing device 200 that displays the editing screen 151 of FIG. 8 on a display or the like.

Referring to FIG. 9, a central processing unit (CPU) 201 executes a variety of processes according to a program recorded in a read only memory (ROM) 202. The CPU 201 executes a variety of processes according to a program loaded in a random access memory (RAM) 203 from a storage unit 209. Further, for example, data necessary for the CPU 201 to execute a variety of processes is appropriately stored in the RAM 203.

The CPU 201, the ROM 202, and the RAM 203 are connected to one another via a bus 204. An input/output (I/O) interface 205 is also connected to the bus 204.

An input unit 206, an output signal generating unit 207, a storage unit 209, and a communication unit 210 are connected to the I/O interface 205.

The input unit 206 includes, for example, a keyboard, a touch panel, a button, a switch, and a fader lever, and inputs a variety of information to the editing device 200. For example, the input unit 206 receives the editor's operation.

The output signal generating unit 207 generates an output signal to be output the outside of the editing device 200, and outputs the output signal to an output unit 208. The output unit 208 includes a display, a speaker, and the like, and outputs a moving image, a sound, and the like which correspond to the received output signal.

The storage unit 209 is configured with a hard disk or the like, and stores a variety of information. For example, data of content of an editing target before and after an edit is stored in the storage unit 209.

For example, the communication unit 210 is configured with a modem, a terminal adapter, or the like and controls communication with another device (not shown) via a network such as the Internet.

Further, a drive 211 is connected to the I/O interface 205 as necessary, and a removable medium 212 including a magnetic disk, an optical disc, a magneto-optical disc, or a semiconductor memory is mounted to the I/O interface 205. A computer program read from the removable medium 212 is installed in the storage unit 209 as necessary.

[Functional Configuration Example of CPU]

Figure 10:
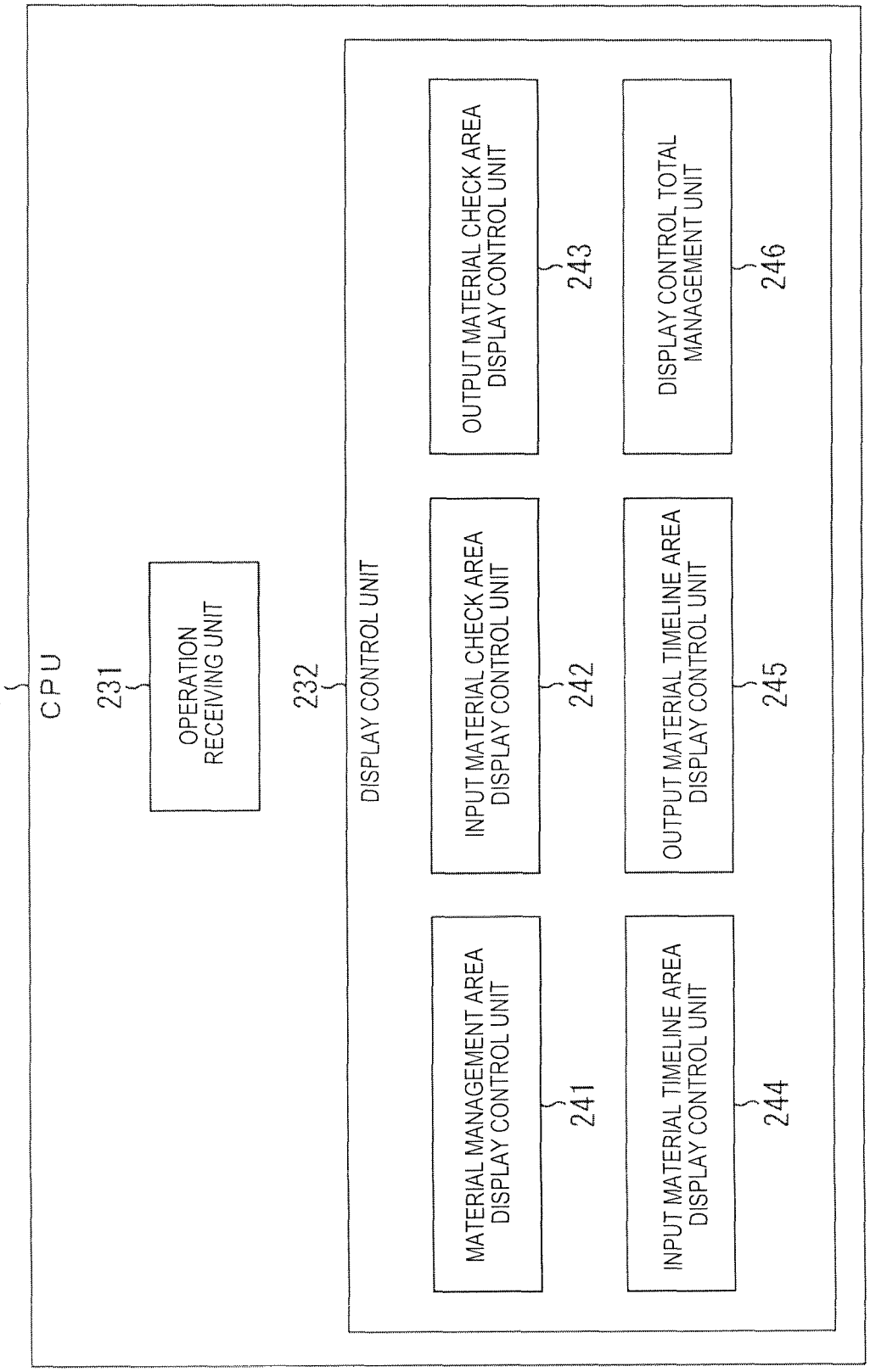
FIG. 10 is a block diagram illustrating a functional configuration example of a CPU.

FIG. 10 is a block diagram illustrating a functional configuration example for implementing a function of executing an editing process among functions included in the CPU 201 of the editing device 200 illustrated in FIG. 9.

The CPU 201 includes an operation receiving unit 231 and a display control unit 232 so that the editor can intuitively understand a temporal relation between a material used for editing and content which is being edited.

The operation receiving unit 231 receives the editor's operation made through the input unit 206, and notifies the display control unit 232 of the content of the operation.

The display control unit 232 includes a material management area display control unit 241, an input material check area display control unit 242, an output material check area display control unit 243, an input material timeline area display control unit 244, an output material timeline area display control unit 245, and a display control total management unit 246.

The material management area display control unit 241 controls a display in the material management area 161.

The input material check area display control unit 242 controls a display in the input material check area 162. For example, the input material check area display control unit 242 reproduces an event arranged in the input material timeline in the input material check area 162.

The output material check area display control unit 243 controls a display in the output material check area 163. For example, the output material check area display control unit 243 reproduces an event arranged in the output material timeline in the output material check area 163.

The input material timeline area display control unit 244 controls a display in the input material timeline area 164. For example, the input material timeline area display control unit 244 displays the input material timeline in which an event is arranged.

The output material timeline area display control unit 245 controls a display in the output material timeline area 165. For example, the output material timeline area display control unit 245 displays the output material timeline in which an event which is being edited or has been edited is arranged.

The display control total management unit 246 generally controls processing related to display control. For example, the display control total management unit 246 causes a reproduction position of an event to be displayed in the input material check area 162 or the output material check area 163.

Next, an editing process performed by the CPU 201 having the above functional configuration will be described.

[Editing Process]

Figure 11:
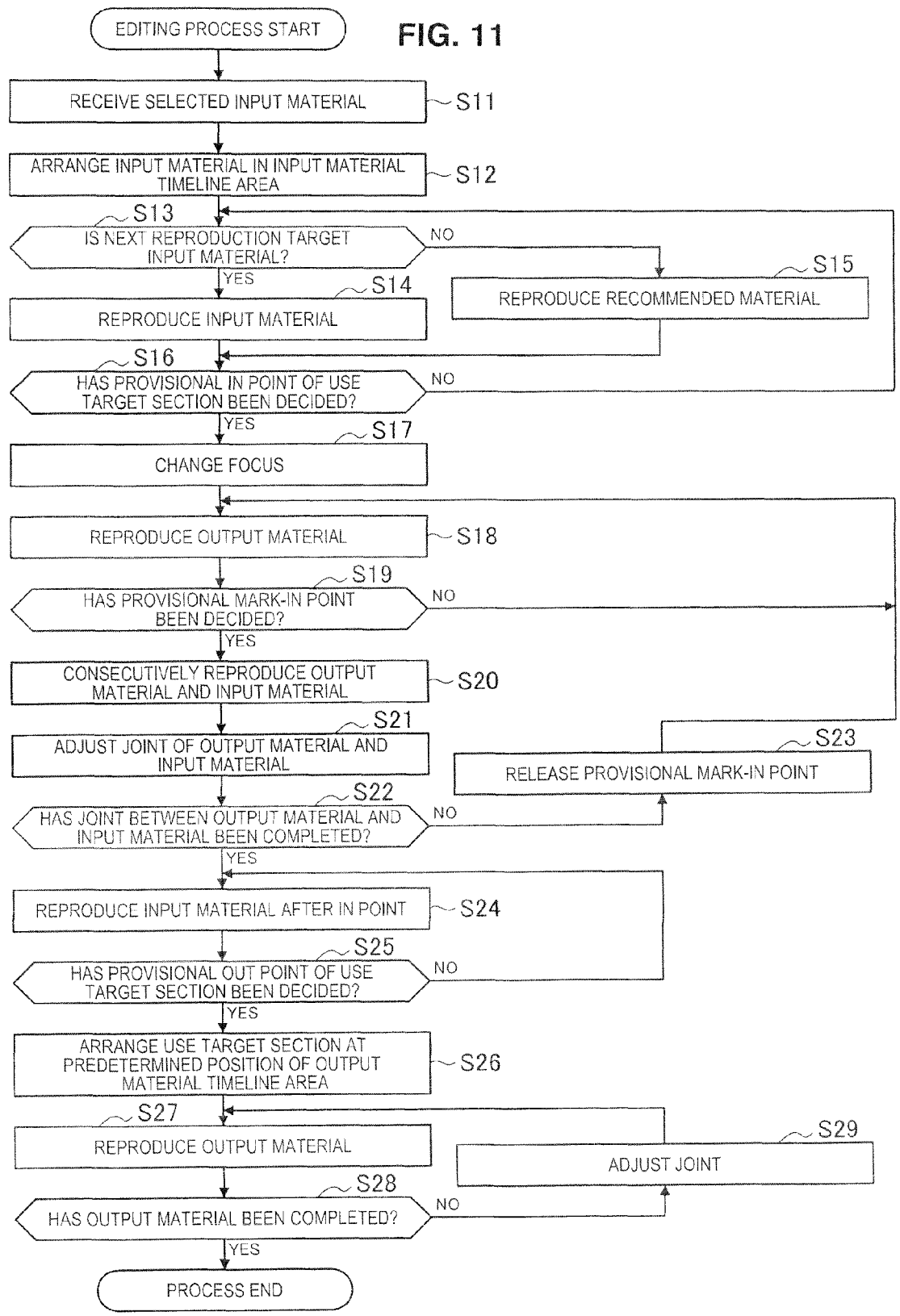
FIG. 11 is a flowchart to explain the flow of an editing process.

FIG. 11 is a flowchart to explain the flow of an editing process.

In step S11, the operation receiving unit 231 receives an input material selected through a predetermined operation which the editor has made through an operating unit.

In step S12, the input material timeline area display control unit 244 arranges the input material received in the process of step S11, that is, the input material selected by the editor in the input material timeline area 164. Here, a concrete example of the processes of steps S11 and S12 will be described with reference to FIG. 12.

Figure 12:
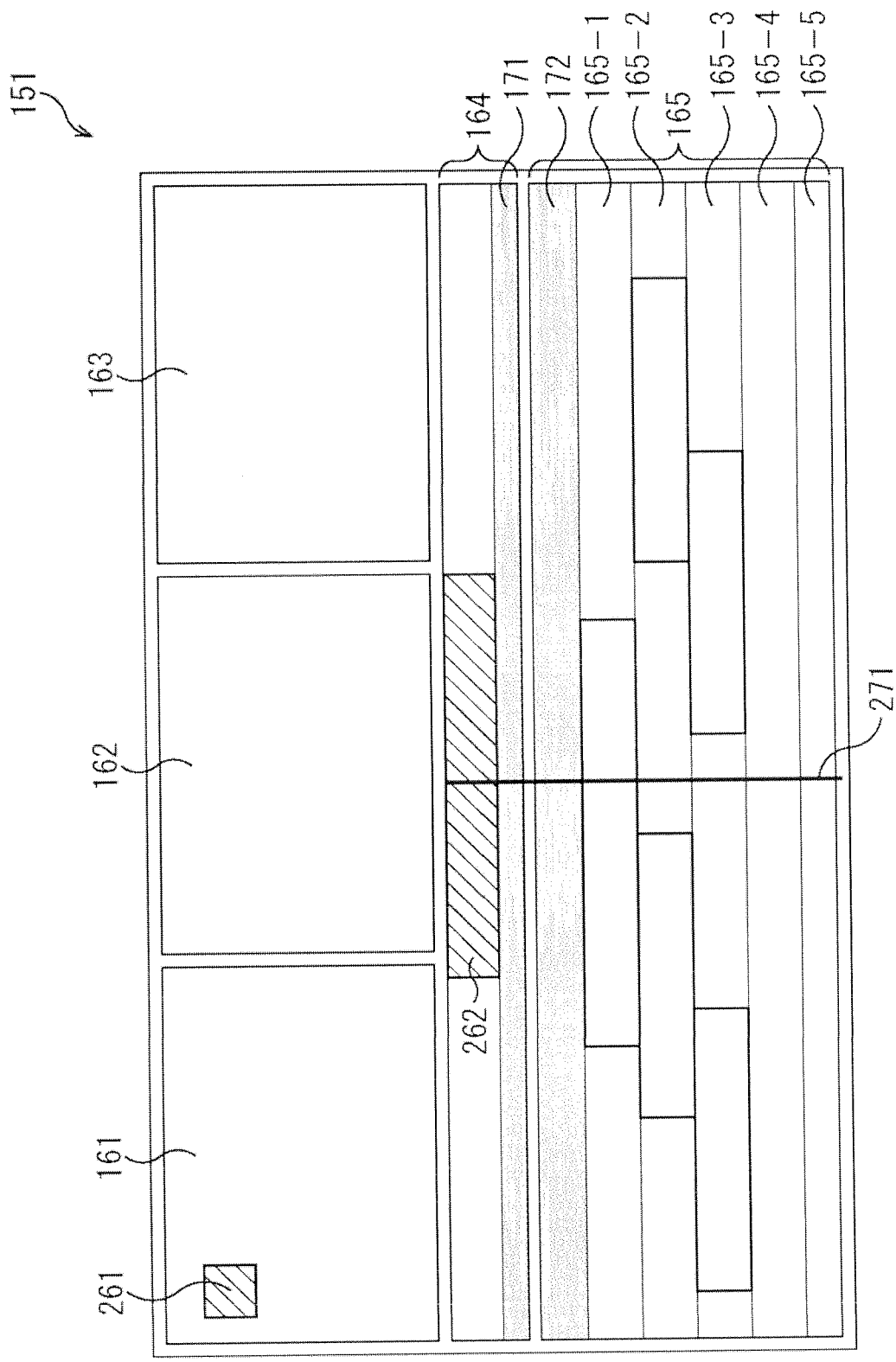
FIG. 12 is a diagram to explain a concrete example of processes of steps S11 and S12.

FIG. 12 is a diagram to explain a concrete example of the processes of steps S11 and S12.

In the example of FIG. 12, only a material 261 among a plurality of materials which the editor uses in the editing is displayed in the material management area 161. The material 261 is selected in the material management area 161 as the input material (step S11). At this time, the editor selects the input material by performing a drag operation or an operation of selecting a corresponding menu from a menu list.

As a result, the material 261 which is the selected input material is arranged in the input material timeline area 164 as an event 262 (step S12). In this case, the event 262 arranged in the input material timeline area 164 and an event arranged in the output material timeline area 165 are expressed by the same time axis. At this time, even when the editor does not perform an explicit operation such as a drag operation, an operation of selecting a corresponding menu from a menu list, or the like, the selected material 261 is arranged in the input material timeline area 164 as the event 262.

At the same time when the event 262 is arranged in the input material timeline area 164, a focus is set to the input material timeline area 164, and the event 262 is displayed on the input material check area 162. Thus, the editor can cause the event to be previewed in the input material check area 162 by performing an operation of a button (not shown) displayed on the input material check area 162 or performing a predetermined operation through an input device in a state in which the focus is set to the input material timeline area 164. The editor can check the reproduction position at which the event 262 is previewed with reference to the position of a play line 271.

Further, when the editor selects a plurality of materials in the material management area 161, each of the plurality of selected materials is arranged in the input material timeline area 164 as an event. As a result, the editor can cause the plurality of materials to be continuously previewed without producing a composite clip.

Returning to the description of the flowchart of FIG. 11, in step S12, when the input material is arranged in the input material timeline area 164, the process proceeds to step S13.

In step S13, the display control total management unit 246 determines whether or not the next reproduction target is the input material. After the input material is arranged in the input material timeline area 164, when an event reproduction instruction operation is made by the editor and received by the operation receiving unit 231, the input material check area display control unit 242 causes the event arranged in the input material timeline area 164 to be reproduced in the input material check area 162. In this case, the display control total management unit 246 determines whether or not the event of the reproduction target is the event 262 which was originally the input material in a predetermined reproduction unit. In the following, data of one frame in a material is used as a reproduction unit, but the reproduction unit is not particularly limited to this example.

When it is determined that the next reproduction target is the event 262 which was originally the input material, that is, when the next reproduction target is data of a predetermined frame in the event 262, YES is determined in step S13, and the process proceeds to step S14.

In step S14, the input material check area display control unit 242 causes the data of the predetermined frame in the event which was originally the input material to be reproduced in the input material check area 162. Thereafter, the process proceeds to step S16. The processes of step S16 and subsequent steps will be described later.

Meanwhile, when the next reproduction target is not the data of the predetermined frame in the event 262 which was originally the input material, NO is determined in step S13, and the process proceeds to step S15.

In step S15, the input material check area display control unit 242 causes data of a predetermined frame in a recommended material to be reproduced in the input material check area 162. For example, a predetermined material which is close in produced time or shot time to the input material, a predetermined material among materials sorted in alphabetical order, a predetermined material having a high rating among rated materials, or the like may be employed as the recommended material. A predetermined material used as the recommended material may be arbitrarily set in advance by the editor.

In steps S14 and S15, the focus remains set to the input material timeline area 164. Here, a concrete example of the processes of steps S13 to S15 will be described with reference to FIG. 13.

Figure 13:
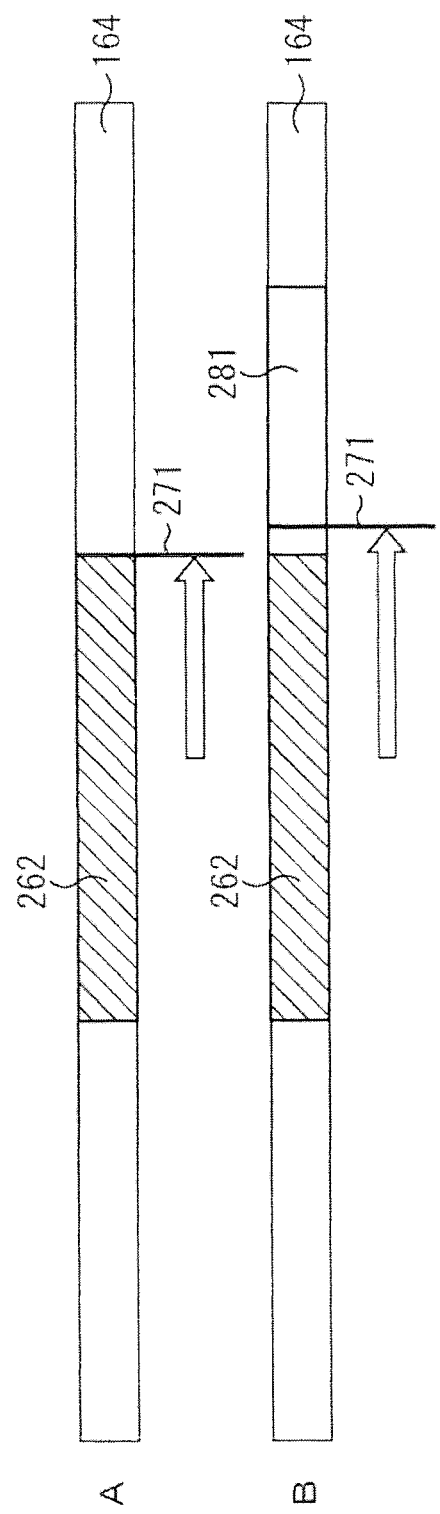
FIG. 13 is a diagram to explain a concrete example of processes of steps S13 to S15.

FIG. 13 is a diagram to explain a concrete example of the processes of steps S13 to S15.

FIG. 13A illustrates the event 262 arranged in the input material timeline area 164.

When the reproduction target is the data of the predetermined frame in the event 262, that is, when the position of the play line 271 is displayed on a section between the start and the end of the event 262, the event 262 is previewed in the input material check area 162. In this case, the position of the play line 271 moves on the event 262 in a right direction represented by a white arrow according to a preview reproduction position. At this time, the editor causes the event 262 to be previewed by operating a button (not shown) displayed on the input material timeline area 164, a shortcut key, or the like.

Then, when the reproduction target is not the data of the predetermined in the event 262, that is, when the position of the play line 271 is displayed outside the section between the start and the end of the event 262 as illustrated in FIG. 13B, a recommended material 281 is previewed in input material check area 162.

Since a material which is highly likely to be used by the editor is displayed as the recommended material 281 set by a predetermined condition in advance as described above, the editor's time and effort of selecting the input material can be saved.

Returning to the description of the flowchart of FIG. 11, when the input material or the recommended material is reproduced in step S14 or step S15, the process proceeds to step S16.

In step S16, the operation receiving unit 231 determines whether or not a provisional in point of the use target section has been decided. In other words, the operation receiving unit 231 determines whether or not the provisional in point which is a provisional in point of the use target section of the event 262 has been decided by a predetermined operation which the editor has made through an operating unit.

When the provisional in point of the use target section has not been decided yet, NO is determined in step S16, the process returns to step S13, and the processes of step S13 and subsequent steps are repeated. In other words, the loop process of steps S13 to S16 is repeated until the provisional in point of the use target section is decided. In this case, the edit causes the event 262 or the recommended material 281 to be repeatedly previewed until the provisional in point of the use target section of the event 262 is decided.

Then, when the provisional in point of the use target section is decided, the process proceeds to step S17.

In step S17, the operation receiving unit 231 changes a focus. In other words, the operation receiving unit 231 changes focus setting from the input material timeline area 164 to the output material timeline area 165 by a predetermined operation which the editor has made through the operating unit.

In step S18, the output material check area display control unit 243 reproduces an output material in the output material check area 163. In other words, the output material check area display control unit 243 causes an event arranged in the output material timeline area 165 to be previewed in the output material check area 163.

When the output material is reproduced in the output material check area 163, the position of the play line 271 moves according to the preview reproduction position. At this time, the provisional in point of the event 262 moves to follow the play line 271. In other words, the event 262 moves according to movement of the play line 271 in a state in which the play line 271 is fixed at the position of the provisional in point. Here, a concrete example of the processes of steps S16 to S18 will be described with reference to FIG. 14.

Figure 14:
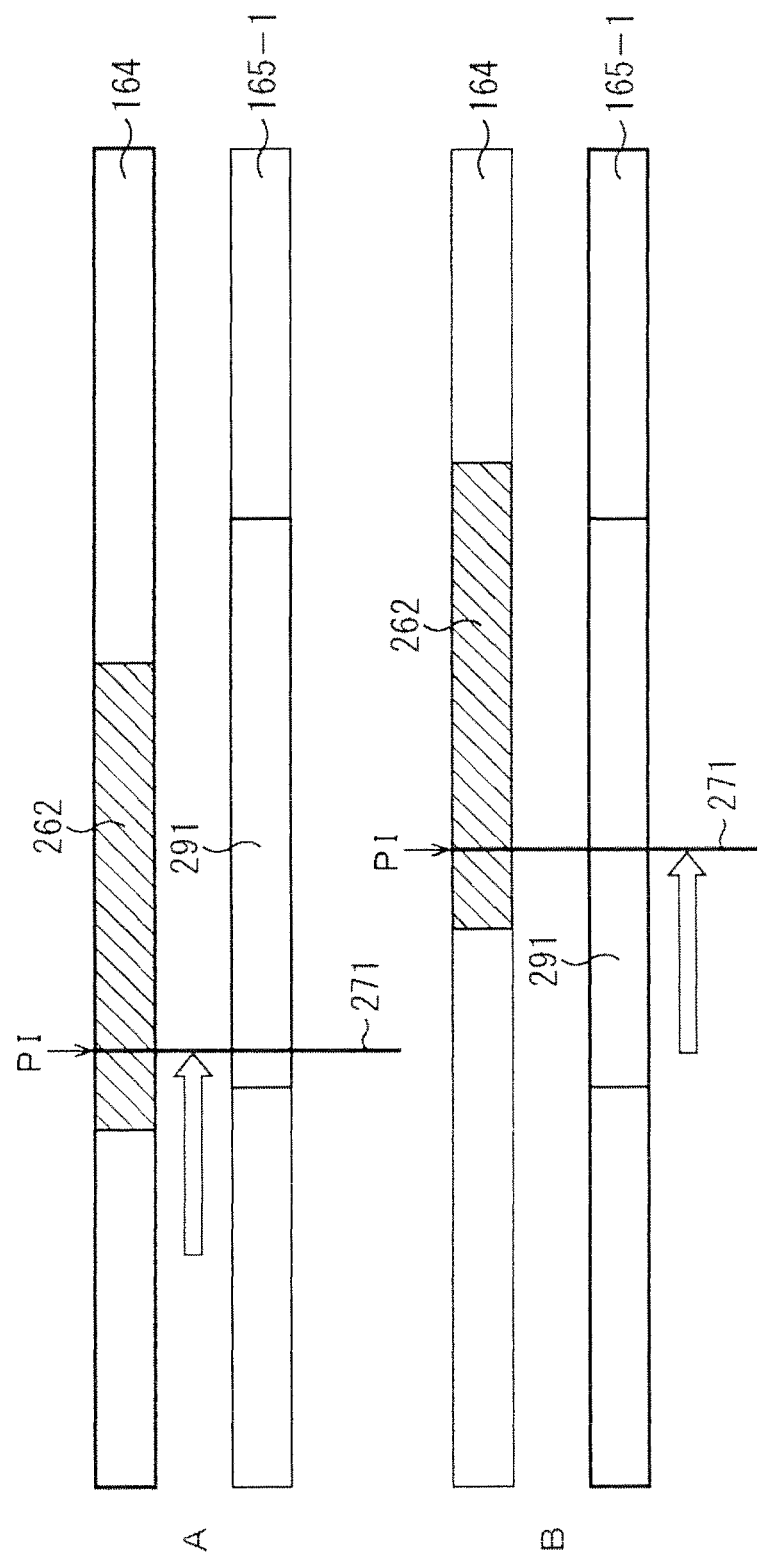
FIG. 14 is a diagram to explain a concrete example of processes of steps S16 to S18.

FIG. 14 is a diagram to explain a concrete example of the processes of steps S16 to S18.

FIG. 14A illustrates the event 262 which is the input material arranged in the input material timeline area 164 and an event 291 which is an output material arranged in a track 165-1 of the output material timeline area 165. In the following, a display of the play line area 171 included in the input material timeline area 164 is not illustrated for the sake of simplicity of description.

The position of the play line 271 moves in a right direction represented by a void arrow according to the preview reproduction position of the event 262 in the input material check area 162. Then, when a provisional in point PI is decided at a predetermined position of the event 262 (step S16), the provisional in point PI is set to the play line area 171 (not shown). At this time, the editor causes the event 262 or the recommended material to be repeatedly previewed in the input material check area 162, and then decides the provisional in point PI with reference to the position of the play line 271 by operating a button (not shown) displayed on the input material timeline area 164, a shortcut key, or the like. In this case, a focus is set on the input material timeline area 164 as illustrated by a thick frame.

When the provisional in point PI is decided, the focus is changed to the output material timeline area 165 by the editor's operation as illustrated in FIG. 14B (step S17). At this time, for example, the editor changes the focus by operating the shortcut key set by himself/herself or the like.

Then, the event arranged in the output material timeline area 165 is previewed in the output material check area 163 (step S18), and the position of the play line 271 moves in the right direction represented by the white arrow according to the preview reproduction position of the event. At this time, the editor may reproduce the event arranged in the output material timeline area 165 by operating a button (not shown) displayed on the input material check area 162, a shortcut key, or the like.

When the position of the play line 271 moves, the provisional in point PI set to the event 262 also moves at the same time to follow the play line 271. In other words, the event 262 moves to follow movement of the play line 271 in a state in which the play line 271 is fixed at the position of the provisional in point PI.

Returning to the description of the flowchart of FIG. 11, when the output material is reproduced in step S18, the process proceeds to step S19.

In step S19, the operation receiving unit 231 determines whether or not the provisional mark-in point has been decided. In other words, the operation receiving unit 231 determines whether or not the provisional mark-in point representing the start position of the use destination section on the output material timeline has been decided by a predetermined operation which the editor has made through the operating unit.

When the provisional mark-in point has not been decided yet. NO is determined in step S19, the process returns to step S18, and the processes of step S18 and subsequent steps are repeated. In other words, the loop process of steps S18 and S19 is repeated until the provisional mark-in point is decided. In this case, the editor causes the event arranged in the output material timeline area 165 to be repeatedly previewed until the provisional mark-in point is decided. Then, when the provisional mark-in point is decided, the process proceeds to step S20. Further, when the provisional mark-in point is decided, movement of the play line 271 and movement of the provisional in point PI following the play line 271 stop.

In step S20, the output material check area display control unit 243 consecutively reproduces the output material and the input material. In other words, when frames of the output material are first sequentially displayed and a last frame of the output material is displayed, a display target is changed to the input material. Then, frames of the input material are sequentially displayed. In other words, the output material check area display control unit 243 causes the event arranged in the output material timeline, which is the output material, and the event 262, which is the input material, to be consecutively previewed in the output material check area 163 based on a signal from the operation receiving unit 231. Here, a concrete example of the processes of steps S19 and S20 will be described with reference to FIG. 15.

Figure 15:
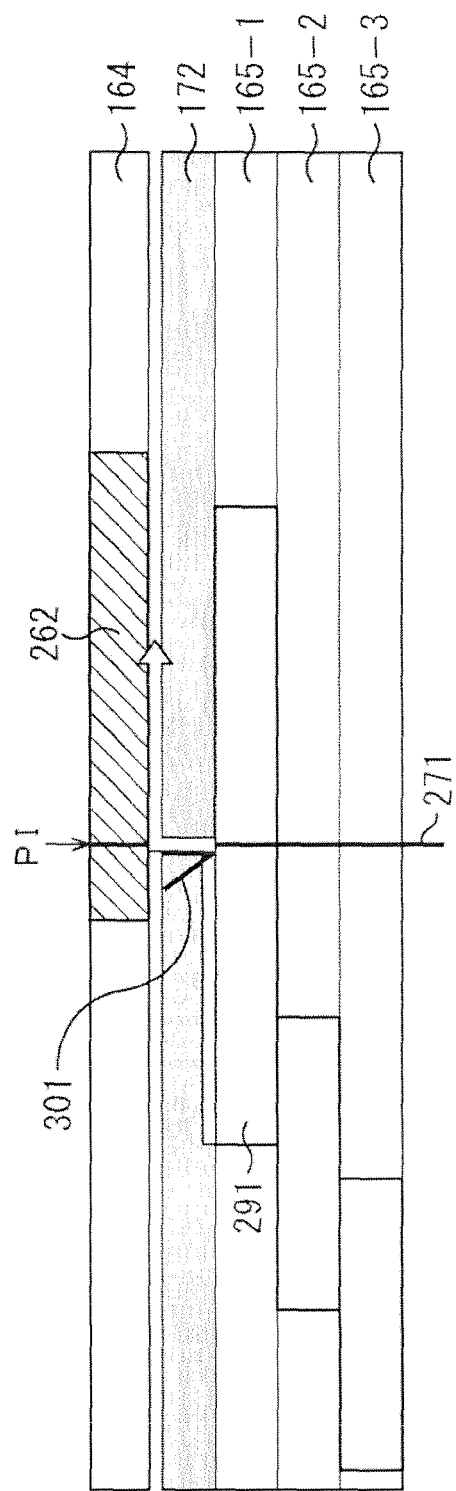
FIG. 15 is a diagram to explain a concrete example of processes of steps S19 and S20.

FIG. 15 is a diagram to explain a concrete example of the processes of steps S19 and S20.

A video corresponding to the event arranged in the output material timeline area 165 is previewed in the output material check area 163. Then, a provisional mark-in point 301 is decided at a predetermined position of the output material timeline (step S19). At this time, the editor sets the provisional mark-in point 301 to the play line area 172 with reference to the position of the play line 271 while viewing the event arranged in the output material timeline area 165, which is previewed in the output material check area 163 by operating a button (not shown) displayed on the output material timeline area 165, a shortcut key, or the like. In the example of FIG. 15, the provisional mark-in point 301 is set between sections of the event 291 arranged in the output material timeline area 165.

As a result, the event 291 which is the output material and the event 262 which is the input material are connected with each other, and consecutively previewed in the output material check area 163 (step S20). In other words, as illustrated by a white arrow, in the output material check area 163, the event 291 is switched to the event 262 at the provisional mark-in point 301, and then the event 262 is displayed. At this time, the editor can consecutively reproduce the event 291 and the event 262 by operating a button (not shown) displayed on the input material check area 162, a shortcut key, or the like.

Thus, the editor can check a video of the joint between the event 291 which is the output material and the event 262 which is the input material in the middle of the editing.

Returning to the description of the flowchart of FIG. 11, when the output material is connected with the input material and then a corresponding video is reproduced in step S20, the process proceeds to step S21.

In step S21, the operation receiving unit 231 adjusts the joint between the output material and the input material. In other words, the operation receiving unit 231 performs the trim edit for finely adjusting the joint between the event 291 and the event 262 in the provisional mark-in point 301 by a predetermined operation which the editor has made through the operating unit. An operation of the trim edit using the editing screen 151 will be described later with reference to FIGS. 18 and 19.

In step S22, the display control total management unit 246 determines whether or not the joint between the output material and the input material has been completed. In other words, the display control total management unit 246 determines whether or not the joint between the event 291 and the event 262 in the provisional mark-in point 301 has been completed by the trim edit.

When it is determined that the joint between the output material and the input material has not been completed, NO is determined in step S22, and the process proceeds to step S23.

In step S23, the display control total management unit 246 releases the provisional mark-in point 301, the process returns to step S18, and then the processes of step S18 and subsequent steps are repeated. In other words, the loop process of steps S18 to S23 is repeated until the joint between the output material and the input material is completed. In this case, until the provisional mark-in point 301 is decided, the editor causes the event arranged in the output material timeline area 165 to be repeatedly reproduced, sets the provisional mark-in point 301, and repeats the process of adjusting the joint. Then, when the joint between the output material and the input material is completed, YES is determined in step S22 and the process proceeds to step S24.

When it is determined that the joint between the output material and the input material has been completed, the provisional mark-in point 301 and the provisional in point PI are simultaneously fixed as the mark-in point 301 and the in point PI, respectively.

In step S24, the input material check area display control unit 242 reproduces the event 262 which is the input material after the in point PI.

In step S25, the operation receiving unit 231 determines whether or not the provisional out point of the use target section has been decided. In other words, the operation receiving unit 231 determines whether or not the provisional out point which is a provisional out point of the use target section of the event 262 has been decided by a predetermined operation which the editor has made through the operating unit. At this time, similarly to the processes of steps S13 to S15, when the next reproduction target is not the input material, that is, when the play line 271 is displayed outside a section between the in point PI and the end of the event 262, the recommended material may be reproduced.

When the provisional out point of the use target section has not been decided yet, NO is determined in step S25, the process returns to step S24, and the processes of step S24 and subsequent steps are repeated. In other words, the loop process of steps S24 and S25 is repeated until the provisional out point of the use target section is decided. In this case, the editor causes the event 262 after the in point PI or the recommended material to be repeatedly previewed until the provisional out point of the use target section is decided.

Then, when it is determined that the provisional out point of the use target section of the event 262 has been decided, the process proceeds to step S26. Since the event 262 and the output material timeline are expressed by the same time axis, when the provisional out point of the use target section is decided, the provisional mark-out point which is the end position of the use destination section of the output material timeline is decided at the same time. Here, a concrete example of the processes of steps S24 and S25 will be described with reference to FIG. 16.

Figure 16:
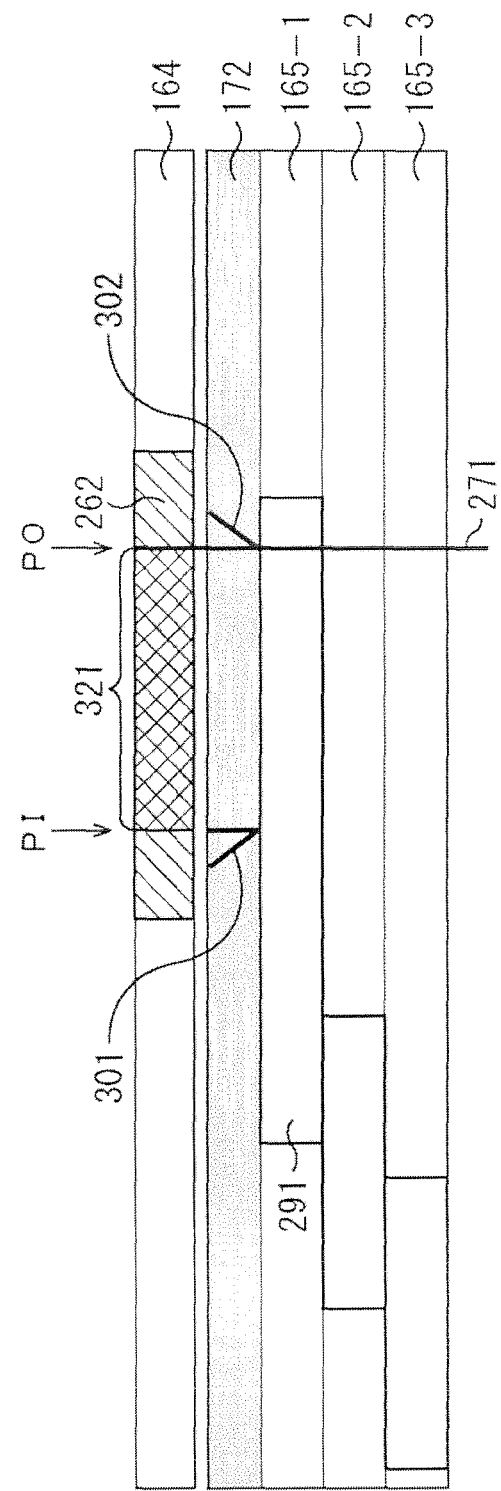
FIG. 16 is a diagram to explain a concrete example of processes of steps S24 and S25.

FIG. 16 is a diagram to explain a concrete example of the processes of steps S24 and S25.

The event 262 after the in point PI is previewed in the input material check area 162 (step S24). At this time, the position of the play line 271 moves according to the preview reproduction position. Thus, the editor decides the provisional out point PO with reference to the position of the play line 271 while viewing the event 262 previewed in the input material check area 162 by operating a button (not shown) displayed on the input material timeline area 164, a shortcut key, or the like (step S25). Further, at the same time when the provisional out point PO is decided, a provisional mark-out point 302 which is the end position of the use destination section of the output material timeline is decided. In the example of FIG. 16, the provisional mark-out point 302 is decided between sections of the event 291 arranged in the output material timeline area 165. When the provisional out point PO is decided, a section between the in point PI and the provisional out point PO of the event 262 is decided as a use target section 321.

Returning to the description of the flowchart of FIG. 11, when the provisional out point PO of the use target section 321 of the event 262 is decided in step S25, the process proceeds to step S26.

In step S26, the output material timeline area display control unit 245 arranges the use target section 321 of the event 262 at a predetermined position of the output material timeline area 165 based on a signal from the operation receiving unit 231. Here, a concrete example of the processes of step S26 will be described with reference to FIG. 17.

Figure 17:
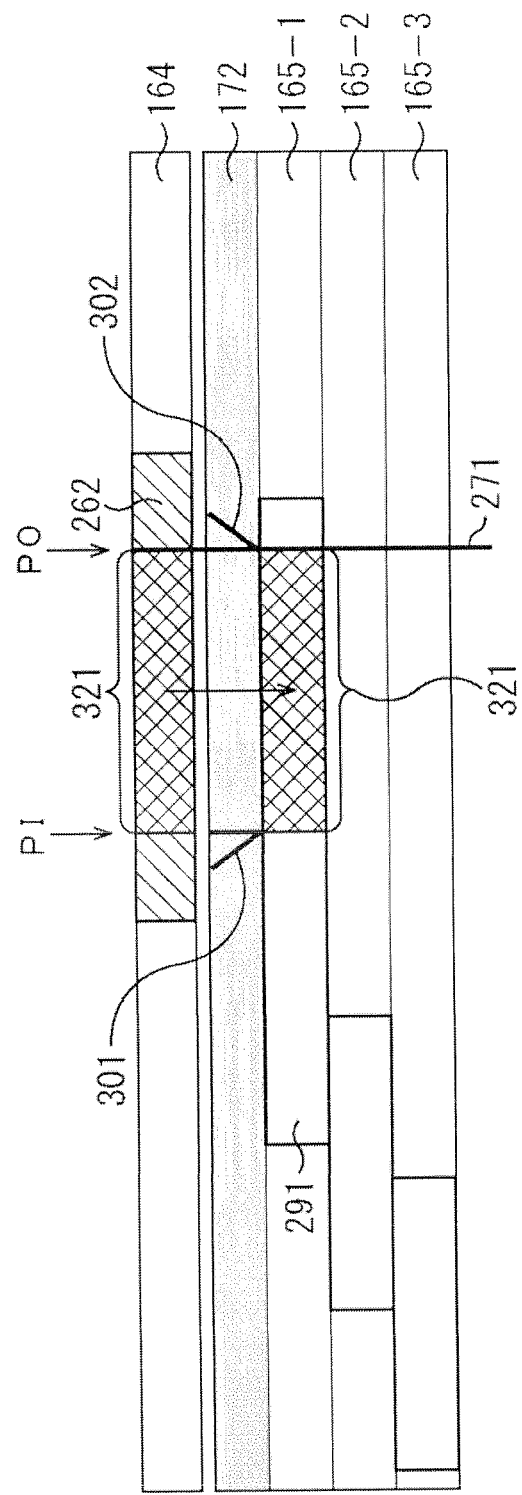
FIG. 17 is a diagram to explain a concrete example of processes of step S26.

FIG. 17 is a diagram to explain a concrete example of the processes of step S26.

In the example of FIG. 17, the use target section 321 of the event 262 is arranged in the track 165-1 of the output material timeline area 165 (step S26). In the example of FIG. 17, the use target section 321 of the event 262 is overwritten on the event 291. At this time, the editor may arrange the use target section 321 of the event 262 at an arbitrary position of the output material timeline area 165, that is, an arbitrary track, by operating an input device, a button (not shown) displayed on the input material timeline area 164, a shortcut key, or the like in a vertical direction.

Returning to the description of the flowchart of FIG. 11, when the use target section 321 of the event 262 is arranged at a predetermined position of the output material timeline area 165 in step S26, the process proceeds to step S27.

In step S27, the output material check area display control unit 243 reproduces the output material. In other words, the output material check area display control unit 243 causes the event arranged in the output material timeline area 165, which includes the newly arranged use target section 321, to be previewed in the output material check area 163.

In step S28, the display control total management unit 246 determines whether or not the output material has been completed. In other words, the display control total management unit 246 determines whether or not the event 291 arranged in the output material timeline area 165, which includes the newly arranged use target section 321, has been completed.

When the output material has not been completed, NO is determined in step S29, and the process proceeds to step S29.

In step S29, the operation receiving unit 231 adjusts the joint of the provisional mark-out point 302. In other words, the operation receiving unit 231 performs the trim edit for finely adjusting the joint between the event 291 and the use target section 321 in the provisional mark-out point 302 by a predetermined operation which the editor has made through the operating unit. When the joint of the provisional mark-out point 302 is adjusted in step S29, the process returns to step S27, and the processes of step S27 and subsequent steps are repeated. In other words, the loop process of steps S27 to S29 is repeated until the output material is completed. In this case, the editor repeats the process of adjusting the joint and reproducing the output material until the output material is completed. Then, when the output material is completed, YES is determined in step S28, and the editing process ends.

Further, when the joint between the event 291 and the use target section 321 in the provisional mark-out point 302 is completed through the trim edit, the provisional out point PO and the provisional mark-out point 302 are fixed at the same time as an out point PO and a mark-out point 302, respectively.

Next, an operation of the trim edit using the editing screen 151 will be described with reference to FIGS. 18 and 19.

Figure 18:
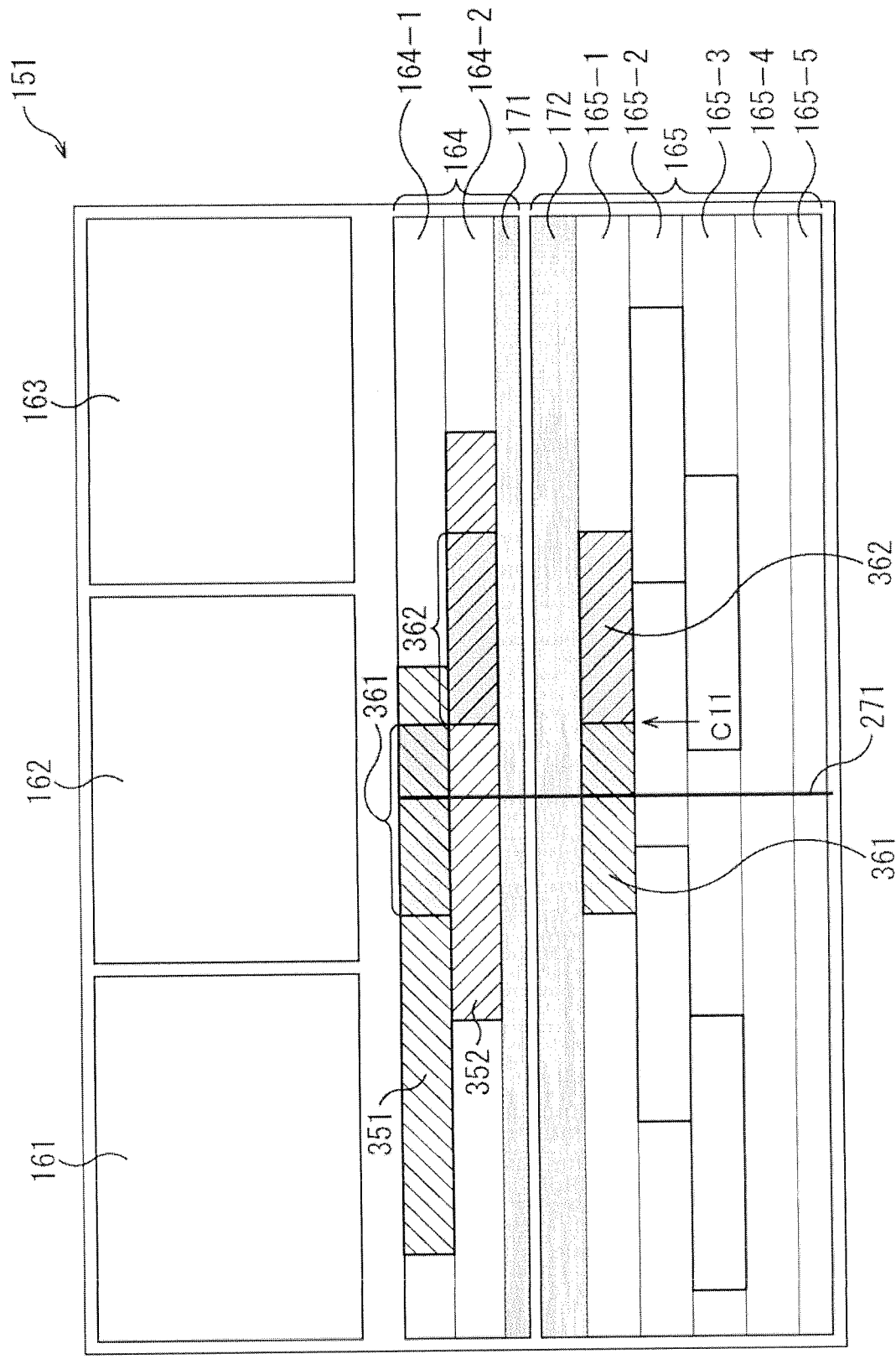
FIG. 18 is a diagram to explain a trim edit.

FIG. 18 is a diagram to explain the A side edit, the B side edit, and the AB side edit in the trim edit.

An event 351 is arranged in a track 164-1 of the input material timeline area 164, and an event 352 is arranged in a track 164-2. Then, the use target section 361 of the event 351 and the use target section 362 of the event 352 are arranged in the track 165-1 of the output material timeline area 165. The use target section 361 of the event 351 is connected with the use target section 362 of the event 352 at a cut point C11.

The editor may refer to the event 351 and the event 352 arranged in the input material timeline area 164 when performing the A side edit, the B side edit, or the AB side edit on the joint between the use target section 361 and the use target section 362. In other words, the editor can perform an edit while viewing the position of the use target section 361 in the entire section of the event 351 and the position of the use target section 362 in the entire section of the event 352.

Thus, for example, when the AB side edit in which both positions of the joint between the use target section 361 and the use target section 362 are changed is performed, it is possible to intuitively understand an extent to which the position of the joint is changeable. Specifically, when it is desired to change the position of the joint between the use target section 361 and the use target section 362 to the right side further than the position represented by the cut point C11 of FIG. 18, the editor may intuitively understand that the position of the joint is changeable only up to the end position of the event 351 arranged in the input material timeline area 164 at maximum.

FIG. 19 is a diagram to explain the slip edit and the slide edit in the trim edit.

An event 381 is arranged in the track 164-1 of the input material timeline area 164, an event 382 is arranged in the track 164-2, and an event 383 is arranged in a track 164-3. A use target section 391 of the event 381, a use target section 392 of the event 382, and a use target section 393 of the event 383 are arranged in the track 165-1 of the output material timeline area 165. The use target section 391 of the event 381 is connected with the use target section 392 of the event 382 at a cut point C12. Further, the use target section 392 of the event 382 is connected with the use target section 393 of the event 383 at a cut point C13.

When the slip edit or the slide edit is performed on each joint, the edit may refer to the events 381 to 383 arranged in the input material timeline area 164. In other words, the editor may perform an edit while viewing the position of each of the use target sections 391 to 393 in the entire section of the events 381 to 383.

Thus, for example, when the slip edit of changing the positions of the in point and the out point of the event 382 of the clipping source without changing the duration of the use target section 392 is performed, the editor may intuitively understand an extent to which the positions of the in point and the out point are changeable.

Specifically, the editor may intuitively understand that the position of the in point of the event 382 is changeable only up to the start position of the event 382 arranged in the input material timeline area 164 at maximum. Similarly, the editor may intuitively understand that the position of the out point of the event 382 is changeable only up to the end position of the event 382 arranged in the input material timeline area 164 at maximum.

Further, for example, even when the slide edit of changing the arrangement position in the track 165-1 without changing the duration of the use target section 392 is performed, the editor may intuitively understand an extent to which the arrangement position of the use target section 392 is changeable.

Specifically, for example, when the arrangement position of the use target section 392 arranged in the output material timeline area 165 is changed to the right side further than the position illustrated in FIG. 19, the editor may intuitively understand that the position of the joint between the use target section 391 and the use target section 392 is changeable only up to the end position of the event 381 arranged in the input material timeline area 164.

Further, the editor may intuitively perform even a transition adjustment of executing special effects such as wipe, fade-in, and fade-out on the joint of the event through the trim edit using the editing screen 151.

In the above-described example, the editing screen 151 includes the input material check area 162 and the output material check area 163 as areas in which the input material or the output material is previewed. However, the input material check area 162 and the output material check area 163 may be integrated into a single material check area. In this case, an event arranged in any one area of the input material timeline area 164 and the output material timeline area 165, which is set as a processing target, is previewed in this single material check area.

As described above, the input material timeline area 164 and the output material timeline area 165 which are included in the editing screen 151 are the same in expressed time axis as each other. Thus, the editor may intuitively understand a temporal relation between a material used for editing and content being edited.

Further, when the use target section of the input material is arranged in the output material timeline area 165, while an edit of three or more points is necessary in the related art, the editor may perform a two-point edit using the editing screen 151. In other words, in the edit of the related art, the editor decides two points of the in point and the out point and thereafter separately decides at least one of the mark-in point and the mark-out point, and so the edit of three or more points is necessary. However, in the edit of the present embodiment, the editor may simultaneously decide the in point and the mark-in point and then simultaneously decide the out point and the mark-out point. Here, an operation of simultaneously deciding the in point and the mark-in point is the same as an operation of deciding one point, and similarly an operation of simultaneously deciding the out point and the mark-out point is the same as an operation of deciding one point. Thus, in the present embodiment, the two-point edit, in which the in point and the out point or the mark-in point and the mark-out point are decided by performing the same operation as the operation of deciding two points, is possible.

Further, the operation of deciding the use target section of the input material and the use destination section of the output material is performed using the input material timeline area 164 and the output material timeline area 165 whose display areas are close to each other. Thus, the editor may complete the editing of deciding the use target section of the input material and the use destination section of the output material in a short time. In other words, the editor may learn the editing using the editing screen 151 in a short time and thus shorten the editing.

Further, in the editing using the editing screen 151, only the editing in the output material timeline area 165 is retained as editing history. Thus, the editing of deciding the use target section of the input material in the input material timeline area 164 is not retained as editing history. Thus, when the editing is re-executed or the edited content is canceled on the event arranged in the output material timeline area 165, desired editing can be easily performed.

Further, when the provisional mark-in point of the output material is decided, the output material and the input material can be consecutively previewed. Thus, the editor can check the video of the joint between the output material and the input material in the middle of editing.

Further, since the input material of the clipping source of the use target section is displayed on the input material timeline area 164, the trim edit can be intuitively performed.

Further, in the editing of deciding the use target section of the input material, a material which is highly likely to be used by the editor is previewed as the recommended material, and thus the editor can save time and effort of selecting the input material.

In the above example, the provisional mark-in point is decided after the provisional in point is decided, and the in point and the mark-in point are simultaneously decided by fixing the provisional in point and the provisional mark-in point. On the other hand, the provisional in point may be decided after the provisional mark-in point is decided, and the in point and the mark-in point may be simultaneously decided by fixing the provisional in point and the provisional mark-in point. Further, in the above example, the in point and the mark-in point are first simultaneously decided, and then the out point and the mark-out point are simultaneously decided. On the other hand, the out point and the mark-out point may be first simultaneously decided, and then the in point and the mark-in point may be simultaneously decided. As described above, in the two-point edit of the present embodiment, there are 4 patterns as a technique of deciding the in point and the out point, and the mark-in point and the mark-out point.

In addition, in the above example, the time axis expressed by the input material timeline area 164 is identical to the time axis expressed by the output material timeline area 165. However, the editor may set the time axis expressed by the input material timeline area 164 to be different from the time axis expressed by the output material timeline area 165. As a result, even in the edit of the present embodiment, the four-point edit of deciding all of four points of the in point, the out point, the mark-in point and the mark-out point can be performed. In other words, in the present embodiment, a total of five patterns may be employed as a technique of deciding the in point, the out point, the mark-in point and the mark-out point.

Furthermore, in the present embodiment, even in the case of the four-point edit, the editor can cause the event arranged in the input material timeline area 164 to be previewed in the input material check area 162 and cause the event arranged in the output material timeline area 165 to be previewed in the output material check area 163. Thus, the editor can decide the four points of the in point and the out point, and the mark-in point and the mark-out point using the input material timeline area 164 and the output material timeline area 165 whose display areas are close to each other while causing the input material and the output material to be previewed in their dedicated check areas, respectively. As described above, the editor can intuitively perform the editing in a short time even in the four-point edit.

[Application to Program of Present Technology]

A series of processes described above may be performed by hardware or software.

When a series of processes is performed by software, a program configuring the software is installed in a computer incorporated into dedicated hardware, a general-purpose personal computer in which various programs can be installed and various functions can be executed, or the like from a network or a recording medium.

The recording medium including the program may be configured with the removable medium (a package medium) 212 which is distributed in order to provide a user with a program separately from a device body as illustrated in FIG. 9 and includes a magnetic disk (including a floppy disk), an optical disc (including a compact disc (CD)-ROM, a digital versatile disc (DVD), or the like), a magnetic optical disc (including a MiniDisc (MD)), a semiconductor memory, or the like, which records a program. Further, the recording medium may be configured with the ROM 202 in which a program is recorded, a hard disk included in the storage unit 209, or the like, which is provided to the user in a state incorporated in a device body in advance.

Further, in this disclosure, steps of describing a program recorded in a recording medium include not only processes which are performed in time series in the described order but also processes which are not executed in time series but executed in parallel or individually.

Further, the embodiments of the present disclosure are not limited to the above-described embodiments, and various modifications can be made within a range not departing from the gist of the present disclosure.

Additionally, the present technology may also be configured as below.

(1)

An editing device, including:

an input material timeline area display control unit that executes control such that an input material timeline in which an event is arranged is displayed, using a material which is an element of selected content as the event; and an output material timeline area display control unit that executes control such that an output material timeline in which an event which is being edited or has been edited is arranged is displayed, wherein the input material timeline and the output material timeline have a same time axis, and the input material timeline area display control unit controls a display of the input material timeline such that the event arranged in the input material timeline is expressed by the same time axis as the event arranged in the output material timeline.

(2)

The editing device according to (1), further including:

an output material check area display control unit that reproduces the event arranged in the output material timeline in an output material check area; and a display control total management unit that executes control such that a play line representing a reproduction position of the event by the output material check area display control unit is moved on the same time axis and displayed, wherein, when the event arranged in the output material timeline is reproduced by the output material check area display control unit after a provisional in point of a predetermined section in the event arranged in the input material timeline is decided, the input material timeline area display control unit controls a display of the input material timeline such that the event arranged in the input material timeline is moved to follow movement of the play line in a state in which the event is fixed to the play line displayed by control of the display control total management unit at a position of the provisional in point.

(3)

The editing device according to (1) or (2), wherein, when a provisional mark-in point of the predetermined section in the event arranged in the input material timeline is decided in the output material timeline, the output material check area display control unit reproduces the event arranged in the output material timeline in the output material check area and then continuously reproduces a portion subsequent to the provisional in point of the event arranged in the input material timeline.

(4)

The editing device according to (1), (2), or (3), wherein, when a provisional out point of the predetermined section in the event arranged in the input material timeline is decided and the predetermined section of the event is decided, the output material check area display control unit controls a display of the output material timeline such that the predetermined section of the event is arranged.

(5)

The editing device according to any of (1) to (4), further including:

an input material check area display control unit that reproduces the event arranged in the input material timeline in an input material check area, wherein, when the event arranged in the input material timeline becomes a reproduction target, the display control total management unit further determines whether or not the reproduction target is the selected material, when the display control total management unit determines that the reproduction target is the selected material, the input material check area display control unit reproduces the selected material, and when the display control total management unit determines that the reproduction target is not the selected material, the input material check area display control unit reproduces a recommended material set by a predetermined condition.

The present technology can be applied to an editing device that edits content.

The present disclosure contains subject matter related to that disclosed in Japanese Priority Patent Application JP 2011-141445 filed in the Japan Patent Office on Jun. 27, 2011, the entire content of which is hereby incorporated by reference.

What is claimed is:

1. An editing device, comprising:
    circuitry configured to:
        control a display of an input material timeline in which a first event is arranged, wherein the first event is a material of selected content; and
        control a display of an output material timeline in which a second event, which is being edited or has been edited, is arranged,
        wherein the input material timeline and the output material timeline have a same time axis,
        wherein the first event moves to follow the movement of a play line, representing a reproduction position of the second event, in a state in which the play line is fixed at a position of a provisional in point of a first predetermined section in the first event, and
        wherein the second event and the first event, as being connected to each other, are continuously reproduced, when a provisional mark-in point of a second predetermined section in the second event is decided.

2. The editing device according to claim 1, further comprising:
    the circuitry is configured to:
        reproduce the second event in an output material check area; and
        control the movement of the play line on the same time axis,
        wherein, when the second event is reproduced after the provisional in point of the first predetermined section in the first event is decided, the display of the input material timeline is controlled such that the first event is moved to follow the movement of the play line in the state in which the play line is fixed at the position of the provisional in point.

3. The editing device according to claim 1, wherein, the circuitry is configured to
    control the display of the output material timeline such that the second predetermined section of the second event is arranged, when a provisional out point of the first predetermined section in the first event is decided.

4. The editing device according to claim 1, wherein the circuitry is configured to:
    reproduce the first event in an input material check area,
    when the first event becomes a reproduction target, determine whether or not the reproduction target is the material,
        when the reproduction target is the material, reproduce the material as the first event, and
        when the reproduction target is not the material, reproduce a recommended material set by a predetermined condition.

5. The editing device according to claim 1, wherein, when the provisional mark-in point of the second predetermined section in the second event is decided, the movement of the play line and the provisional in point, that follows the play line, stop.

6. The editing device according to claim 1,
    wherein the first predetermined section in the first event is connected with the second predetermined section in the second event at a cut point by changing an end position of the first predetermined section, and
    wherein the connected first predetermined section and the second predetermined section are arranged in the output material timeline.

7. The editing device according to claim 1,
    wherein the first predetermined section in the first event is connected with the second predetermined section in the second event at a cut point by changing a start position of the second predetermined section, and
    wherein the connected first predetermined section and the second predetermined section are arranged in the output material timeline.

8. An editing method, comprising:
    controlling a display of an input material timeline in which a first event is arranged, wherein the first event is a material of selected content;
    controlling a display of an output material timeline in which a second event, which is being edited or has been edited, is arranged,
        wherein the input material timeline and the output material timeline have a same time axis;
    controlling the display of the input material timeline such that the first event moves to follow the movement of a play line, representing a reproduction position of the second event, in a state in which the play line is fixed at a position of a provisional in point of a first predetermined section in the first event; and
    continuously reproducing the second event and the first event, as being connected to each other, when a provisional mark-in point of a second predetermined section in the second event is decided.

9. A non-transitory computer readable medium having stored thereon, a set of computer-executable instructions for causing the computer to perform steps comprising:
    controlling a display of an input material timeline in which a first event is arranged, wherein the first event is a material of selected content;
    controlling a display of an output material timeline in which a second event, which is being edited or has been edited, is arranged,
        wherein the input material timeline and the output material timeline have a same time axis;
    controlling the display of the input material timeline such that the first event moves to follow the movement of a play line, representing a reproduction position of the second event, in a state in which the play line is fixed at a position of a provisional in point of a first predetermined section in the first event; and
    continuously reproducing the second event and the first event, as being connected to each other, when a provisional mark-in point of a second predetermined section in the second event is decided.

* * * * *